United States Patent
Grave et al.

(10) Patent No.: US 9,314,715 B2
(45) Date of Patent: Apr. 19, 2016

(54) MULTIPHASE SEPARATION SYSTEM

(71) Applicants: Edward J. Grave, Spring, TX (US); Adam S. Bymaster, Burleson, TX (US); Michael D. Olson, The Woodlands, TX (US); Per-Reidar Larnholm, Moss (NO); Scott M. Whitney, Spring, TX (US)

(72) Inventors: Edward J. Grave, Spring, TX (US); Adam S. Bymaster, Burleson, TX (US); Michael D. Olson, The Woodlands, TX (US); Per-Reidar Larnholm, Moss (NO); Scott M. Whitney, Spring, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 14/683,854

(22) Filed: Apr. 10, 2015

(65) Prior Publication Data

US 2015/0306520 A1 Oct. 29, 2015

Related U.S. Application Data

(60) Provisional application No. 61/985,873, filed on Apr. 29, 2014, provisional application No. 62/126,148, filed on Feb. 27, 2015.

(51) Int. Cl.
*E21B 7/12* (2006.01)
*B01D 17/04* (2006.01)
(Continued)

(52) U.S. Cl.
CPC ............... *B01D 17/04* (2013.01); *B01D 17/00* (2013.01); *B01D 17/045* (2013.01); *E21B 43/34* (2013.01); *E21B 43/36* (2013.01); *E21B 43/40* (2013.01)

(58) Field of Classification Search
CPC ..................................................... E21B 43/36
USPC ....................................................... 166/357
See application file for complete search history.

(56) References Cited

U.S. PATENT DOCUMENTS 1,496,090 A * 6/1924 Marker et al. ............ 210/170.01
1,516,132 A * 11/1924 Allen et al. .................... 210/109
(Continued)

FOREIGN PATENT DOCUMENTS

FR     2 911 794    8/2008
RU      2451251     5/2011
(Continued)

OTHER PUBLICATIONS

Grave, E., "Design and Performance Testing of an Integrated, Subsea Compact Separation System for Deep-water Applications," XP055224336, MCE Deepwater Development, Madrid, Spain, 12 pgs. (Apr. 8-9, 2014).
(Continued)

*Primary Examiner* — Matthew R Buck
*Assistant Examiner* — Aaron Lembo
(74) *Attorney, Agent, or Firm* — ExxonMobil Upstream Research Company Law Department

(57) ABSTRACT

The current disclosure relates to multiphase fluid separation via a multiphase separation system. The multiphase separation system is configured to feed a multiphase fluid into feed lines within the multiphase separation system, wherein the feed lines consist of an upper line, a middle line, and a lower line. The upper line is configured to flow a first stream substantially including oil into an oil section of a control volume. The middle line is configured to flow a second stream substantially including an oil/water emulsion into an oil/water emulsion section of the control volume. The lower line is configured to flow a third stream substantially including water into a water section of the control volume. The control volume is configured to adjust fluid flow rate at an outlet, wherein the oil section, the water section, and the oil/water emulsion section each commingle at different heights of the control volume.

27 Claims, 16 Drawing Sheets

(51) Int. Cl.
*E21B 43/36* (2006.01)
*B01D 17/00* (2006.01)
*E21B 43/34* (2006.01)
*E21B 43/40* (2006.01)

(56) References Cited

U.S. PATENT DOCUMENTS

| | | | |
|---|---|---|---|
| 1,559,115 A | 10/1925 | Marker et al. | |
| 3,768,726 A | 10/1973 | Hale et al. | 233/16 |
| 3,986,954 A * | 10/1976 | George et al. | 210/706 |
| 4,187,088 A | 2/1980 | Hodgson | 55/169 |
| 4,661,127 A | 4/1987 | Huntley | 55/174 |
| 5,288,312 A * | 2/1994 | Payne et al. | 96/158 |
| 6,197,095 B1 | 3/2001 | Ditria et al. | 95/248 |
| 7,051,540 B2 | 5/2006 | TeGrotenhuis et al. | 62/93 |
| 7,363,982 B2 | 4/2008 | Hopper | 166/357 |
| 7,490,671 B2 | 2/2009 | Gramme et al. | 166/357 |
| 7,516,794 B2 | 4/2009 | Gramme et al. | 166/357 |
| 7,540,902 B2 | 6/2009 | Esparza et al. | 95/243 |
| 7,611,635 B2 | 11/2009 | Chieng et al. | 210/744 |
| 8,273,151 B2 | 9/2012 | Miotto et al. | 95/24 |
| 8,282,711 B2 | 10/2012 | Grenstad et al. | 95/253 |
| 8,308,959 B2 * | 11/2012 | Noles, Jr. | 210/801 |
| 8,657,897 B2 | 2/2014 | Kayat et al. | 55/337 |
| 8,657,940 B2 | 2/2014 | Aarebrot et al. | 96/188 |
| 2004/0053808 A1 * | 3/2004 | Raehse et al. | 510/447 |
| 2005/0006086 A1 | 1/2005 | Gramme | 166/105.5 |
| 2008/0105616 A1 * | 5/2008 | Allouche | 210/637 |
| 2008/0116072 A1 | 5/2008 | Liverud et al. | 204/563 |
| 2010/0032164 A1 | 2/2010 | Bakke | 166/366 |
| 2011/0036788 A1 * | 2/2011 | Michael et al. | 210/802 |
| 2012/0160103 A1 | 6/2012 | Suppiah et al. | 95/249 |
| 2013/0025461 A1 * | 1/2013 | Gouy et al. | 96/189 |
| 2013/0092633 A1 * | 4/2013 | Abrand et al. | 210/747.6 |
| 2014/0209465 A1 * | 7/2014 | Whitney et al. | 204/555 |
| 2014/0227548 A1 * | 8/2014 | Myrick | 428/570 |

FOREIGN PATENT DOCUMENTS

| | | |
|---|---|---|
| WO | WO 2004/003341 | 1/2004 |
| WO | WO2010/151392 | 5/2010 |
| WO | WO2014/018148 | 1/2014 |
| WO | WO2014/058480 | 4/2014 |

OTHER PUBLICATIONS

Chuang, K. T. et al. (2000) "Tray Columns: Design," *Academic Press*, pp. 1135-1140 (retrieved from the internet on Dec. 4, 2014: http://razifar.com/cariboost_files/Tray_20Colums_20Deisgn.pdf.

Hannisdal, A. et al. (2013) "Compact Separation Technologies and their Applicability for Subsea Field Development in Deep Water," *Offshore Technology Conf.*, OTC23223, Houston, TX Apr. 30-May 3, 2012, pp. 1-12.

Sinker, A. et al. (1997) "Applying the Compact Separation Methodology to Heavy Oil Separation," *Heavy Oil Field Development*, Sep. 29-30, 1997; Aberdeen, UK, 17 pages.

* cited by examiner

200

400

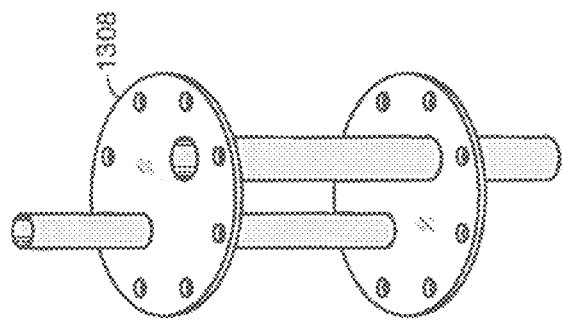 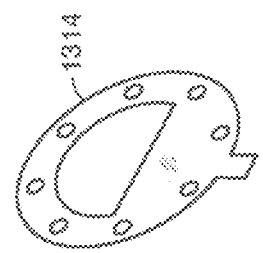
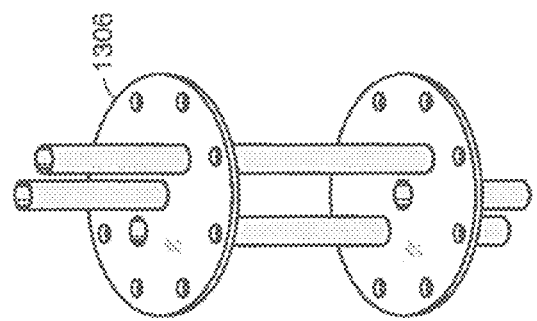 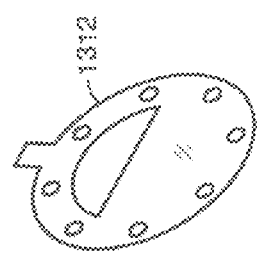
FIG. 14    FIG. 15
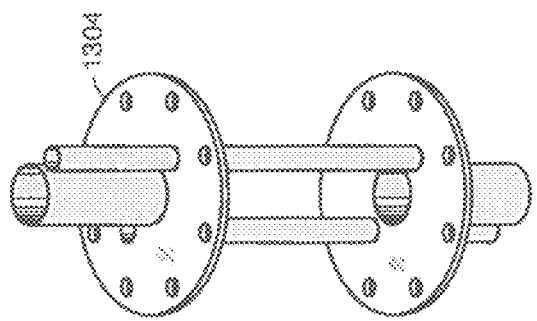 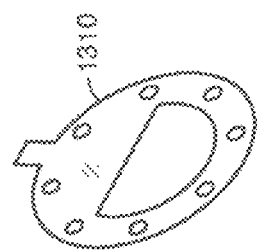

MULTIPHASE SEPARATION SYSTEM

CROSS REFERENCE TO RELATED APPLICATIONS

This application is related to both U.S. patent application No. 61/985,873 filed Apr. 29, 2014 entitled MULTIPHASE SEPARATION SYSTEM, and U.S. patent application No. 62/126,148 filed Feb. 27, 2015 entitled MULTIPHASE SEPARATION SYSTEM, the entirety of which is incorporated by reference herein.

FIELD

The present techniques provide for the separation of oil and water feed streams within production fluids. More specifically, the techniques provide for the separation of production fluids into component oil and water phases using a subsea multiphase separation system.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Any of a number of subsea separation techniques may be used to enhance the amount of oil and gas recovered from subsea wells. However, subsea separation at water depths greater than 1500 meters becomes especially challenging due to the environmental conditions. As water depth increases, the external pressure on a vessel created by the hydrostatic head increases the required wall thickness for vessels used for subsea processing. At water depths greater than 1500 meters, this wall thickness increases to such an extent that typical gravity separation vessels are not practical. In addition, vessels with such a large wall thickness can be a challenge to fabricate, and the added material and weight can impact project economics, as well as the retrievability of the vessel for maintenance. As a result, large diameter separators often cannot be used at such water depths.

Studies have been done concerning liquid and gas separation in subsea systems and methods in U.S. Pat. No. 8,282,711B2. These systems and methods describe the separation of liquids and gases from a subsea production fluid, using a pipe system that splits the flows of the liquid and gaseous fluids through separate manifolds.

Additional studies concerning a pipe separator system for improving separation may be found in U.S. Pat. No. 7,490,671. The system describes a pipe separator, which utilizes a cyclone and an electrostatic coalescer as part of the separator body, for separation of oil, gas, and water originating from a subsea well.

Additional studies concerning a pipe separator for the separation of fluids may be found in U.S. Pat. No. 7,516,794. This system describes a pipe system similar to that in U.S. Pat. No. 7,490,671, and flows fluids into separate pipe manifolds. The pipe system described adds the requirement that the system be "piggable".

Additional studies concerning an installation for the separation of fluids may be found in U.S. Application 2005/0006086. The system describes pipe separators that form a part of the transport pipeline, and that utilize an electrostatic coalescer to separate an oil, gas, and water stream.

Additional studies concerning a method and apparatus for improving the performance of a separator may be found in U.S. Application 2008/0116072. The method and apparatus describe a gravity settling vessel, and feeding an off-take stream through a compact electrostatic coalescer and back into the settling vessel.

SUMMARY

An exemplary embodiment provides a multiphase separation system including a separation line configured to feed a multiphase fluid into vertically oriented feed lines within the separation system, wherein the feed lines consist of an upper line, a middle line, and a lower line. The upper line is configured to flow an oil feed line into an oil section. The middle line is configured to flow an oil/water emulsion feed line into an oil/water emulsion section. The lower line is configured to flow a water feed line into a water section. The multiphase separation system also includes a control volume configured to adjust fluid flow rate at an outlet, wherein the oil section, the water section, and the oil/water emulsion section commingle at different heights of the vertically oriented control volume.

Another exemplary embodiment provides a method for separation of oil and water and oil/water emulsion within a multiphase fluid, including flowing a multiphase fluid into a distribution inlet of a multiphase separation system. The method includes separating the multiphase fluid into an oil phase, a water phase, and an oil/water emulsion. The oil phase is separated into a line that is in a plane vertically above a plane of the distribution inlet. The water phase is separated into a line that is in a plane vertically below the plane of the distribution inlet. The oil/water emulsion is separated into a line that is in a plane vertically above the plane of the line with the water phase and vertically below the plane of the line with the oil phase. The method also includes flowing each line into a vertically oriented control volume, wherein the flow rate from each line is controlled, the oil and water level present in each line is detected, and each line is separated into an outlet from the control volume.

Another exemplary embodiment discloses a separation system that includes an inlet line configured to feed a multiphase fluid into side feed lines within the separation system, wherein the side feed lines consist of a plurality of upper lines and a plurality of lower lines. Each upper line of the separation system is configured to feed an oil side feed line into an oil section and further configured to split the inlet line into an oil/water emulsion section, wherein the oil section is in a plane located vertically above the oil/water emulsion section. Each lower line of the separation system is configured to feed a water side feed line into a water section, wherein the water section is in a plane located vertically below the oil/water emulsion section, and the water section is coupled to the oil/water emulsion section by a subsequent water side draw stemming from the oil/water emulsion section. The separation system also includes a control volume and a control system.

DESCRIPTION OF THE DRAWINGS

The advantages of the present techniques are better understood by referring to the following detailed description and the attached drawings, in which:

FIG. 14 is a perspective diagram of the downcomers/riser apparatuses of the multiphase separation system of FIG. 13;

FIG. 15 is a perspective diagram of the weirs of the multiphase separation system of FIG. 13.

DETAILED DESCRIPTION

Figure 1:
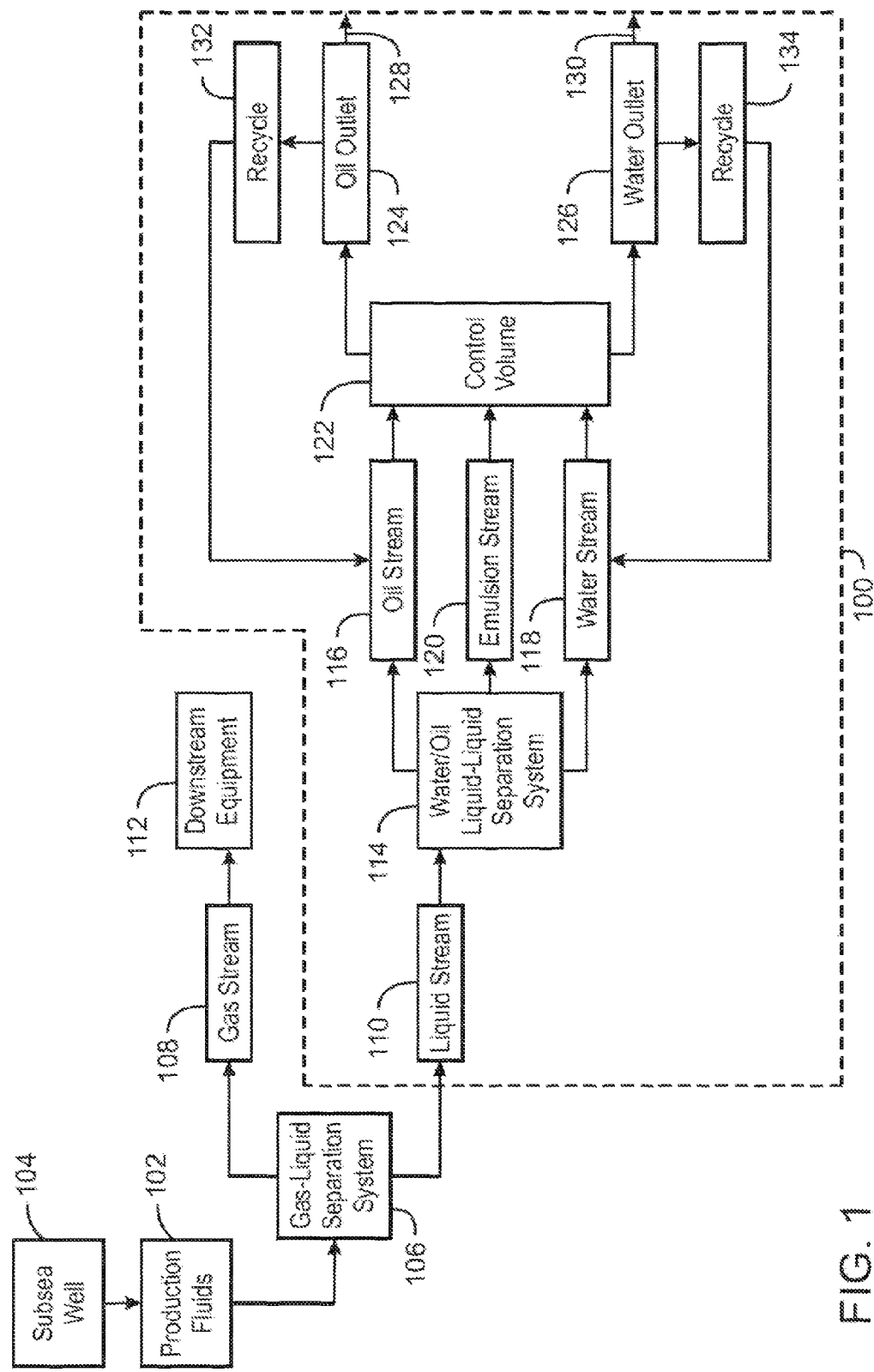
FIG. 1 is a block diagram of a multiphase separation system for separating production fluids that may be obtained from a subsea well.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

As used herein, "substantially", "predominately" and other words of degree are relative modifiers intended to indicate permissible variation from the characteristic so modified. It is not intended to be limited to the absolute value or characteristic which it modifies, but rather possessing more of the physical or functional characteristic than its opposite, and preferably, approaching or approximating such a physical or functional characteristic.

A "multiphase fluid" is a fluid that is amenable to flow and that is composed of two phases that are not chemically related (e.g., oil and water) or where more than two phases are present (e.g., liquid and gas).

An "emulsion" usually comprises two immiscible phases. The two immiscible phases include a continuous (or external) phase and a discontinuous (or internal) phase. The discontinuous phase comprises the secondary fluid that usually exists in droplets in the continuous phase. Two varieties of emulsions are oil-in-water and water-in-oil. Oil-in-water emulsions usually include a fluid at least partially immiscible in an oleaginous fluid (usually an aqueous-based fluid) as the continuous phase and an oleaginous fluid as the discontinuous phase. Water-in-oil emulsions are the opposite, having the oleaginous fluid as the continuous phase and a fluid at least partially immiscible in the oleaginous fluid (usually an aqueous-based fluid) as the discontinuous phase. Water-in-oil emulsions may be also referred to as invert emulsions.

A "demulsifier" refers to a surfactant or combination of surfactants that inhibits or prevents dispersion in an emulsion, thereby permitting the immiscible substances to be more readily separated from one another.

A "weir" refers to a physical barrier that can act as a gravity settling structure, and, as used herein, is meant to separate water from oil flowing in a particular stream. As used herein, the weir may also be extended downwards to force separation of floating fluids from denser fluids, such as oil from water.

As discussed above, traditional separators, which often have a diameter of about one meter or more, face technical challenges in deep water use, for example, at depths greater than approximately 1500 meters. Thus, embodiments described herein provide an unconventional separation system that is capable of achieving acceptable oil-water separation, while meeting the size and weight restrictions imposed on deep water processing units. Further, the separation system can be designed to pipe code instead of vessel code, which may provide cost and weight savings. In many cases, for a given pressure class, the required wall thickness for a pipe is less than the required wall thickness for a corresponding vessel.

According to embodiments described herein, a multiphase separation system may be used to enhance production from subsea wells, especially in deep water and Arctic environments. In various embodiments, the separation system is a pipe separator that can be configured to separate production fluids into an oil phase, an aqueous phase, and a solid phase (or slurry). In some embodiments, the separator can be configured to separate gaseous production fluids. In other words, examples of the current separation techniques may be used to create single phase streams. This may allow for the usage of single phase pumps, which are more efficient and can achieve larger pressure differentials compared to multiphase pumps. For example, one single phase pump may be sufficient to pump a single phase stream. In contrast, a series of multiphase pumps may be needed to achieve the same pressure differential while pumping a multiphase stream, especially for high boosting applications.

The separation process described herein may be used to achieve bulk removal of aqueous fluids from production fluids. The removal of aqueous fluids is termed water removal herein, although this may be understood to include water with other contaminants, such as salts or other miscible fluids. Such bulk water removal may mitigate flow assurance concerns, by allowing substantially pure gas and oil streams to be sent to the surface. These substantially pure streams will form lower amounts of hydrates, such as methane clathrates, thus lowering the risk of plugging or flow restrictions. Further, corrosion concerns can be reduced or eliminated. The sand and water by-product streams can then be disposed to dedicated disposal zones, to the sea, or may be used for pressure maintenance in production reservoirs.

Bulk water removal may also result in a decrease in the hydrostatic head acting on the reservoir, thus increasing both the reservoir drive and production. Bulk water removal may also reduce flow line infrastructure, reduce the number of topside water treating facilities, reduce power and pumping requirements, and de-bottleneck existing facilities that are challenged with declining production rates due to increased water cuts.

FIG. 1 is a block diagram showing a multiphase separation system 100 for separating production fluids 102 that may be obtained from a subsea well 104. The multiphase fluid may be any type of fluid that includes a water phase and an oil phase components that are relatively immiscible. For example, the multiphase fluid may be production fluids 102 from a subsea well 104. The production fluids 102 may be hydrocarbon fluids that include a mixture of natural gas, crude oil, brine, and solid impurities, such as sand. The production fluids 102 may be obtained from the subsea well 104 via any type of subsea production system (not shown) that is configured to produce hydrocarbons from subsea locations. A gas-liquid separation system 106 can optionally be used upstream to separate a gas stream 108 and a liquid stream 110.

In an exemplary embodiment, the production fluids 102 are separated into gas and liquid phases in a gas-liquid separation system 106. The gas stream 108 can be further processed by downstream equipment 112. The downstream equipment 112 may include, for example, any type of downstream gas processing equipment, such as a gas compressor, gas treatment facility, gas polishing device, or the like, or a gas pipeline.

In embodiments described herein, the liquid stream 110 can be flowed into an oil/water liquid-liquid separation system 114. The oil/water separation system 114 is a pipe separator that is configured to achieve bulk separation of the liquid stream 110 into an oil stream 116, a water stream 118, and, in some examples, an oil/water emulsion stream 120.

Within the multiphase separation system 100, the liquid stream 110 can be separated into separate streams 116, 118, 120, which can flow through a polishing section until the streams commingle at a control volume 122. A control volume is used, for example, to achieve final phase separation and to maintain the separate phases of oil and water before flowing substantially oil through an oil outlet 124 and substantially water through a water outlet 126. Designs for the separation system 100, as well as the mechanisms by which the multiphase separation system 100 may affect the quality of the separated oil phase, water phase and oil/water emulsion, are described with respect to FIGS. 3-8.

In some embodiments, the oil in the separation system 100 is flowed out of the top of the control volume 122 through the oil outlet 124. From the oil outlet 124, a substantially pure oil stream 128, which may be processed by downstream equipment. The downstream equipment may include, for example, any type of processing equipment, such as an oil treatment facility, or an oil pipeline, among others. A portion of the oil from the oil outlet 124 can be recycled back into the oil stream 116 upstream of the control volume 122 as an oil recycle stream 132.

The water in the separation system 100 is flowed out of the bottom of the control volume 122 through the water outlet 126. A portion of the substantially pure water stream 130 from the water outlet 126 can be recycled back into the water stream 118 as a water recycle stream 134, for example, upstream of the control volume 122. This can be useful to flush out sand and other sediments that may have accumulated at the bottom of the pipe separator through which the water stream 118 flows.

Additional treatment of each of the streams 116, 118, and 120 is possible upstream the control volume 122, and additional treatment to the substantially pure oil stream 128 and the substantially pure water stream 130 is possible downstream of the control volume 122. For example, oil and water pre-treating or coalescence equipment, such as a heating system, a chemical injection system, an electrostatic coalescer, or the like, or a cyclone for oil-water separation, or liquid export pipelines could each be used in addition to the current separation techniques.

The block diagram of FIG. 1 is not intended to indicate that the multiphase separation system 100 is to include all of the components shown in FIG. 1. Further, any number of additional components may be included within the multiphase separation system 100, depending on the details of the specific implementation. For example, the multiphase separation system 100 can be designed to achieve gas/liquid as well as liquid/liquid separation, with or without pre-treatment, thus delivering substantially pure oil, pure water, and pure gas streams to the downstream equipment. Further, multiphase and liquid desanders (not shown) may be placed upstream and/or downstream of the multiphase separation system 100. Moreover, the multiphase separation system 100 can be considered a tubular configured to flow a multiphase fluid and achieve phase separation.

Figure 2:
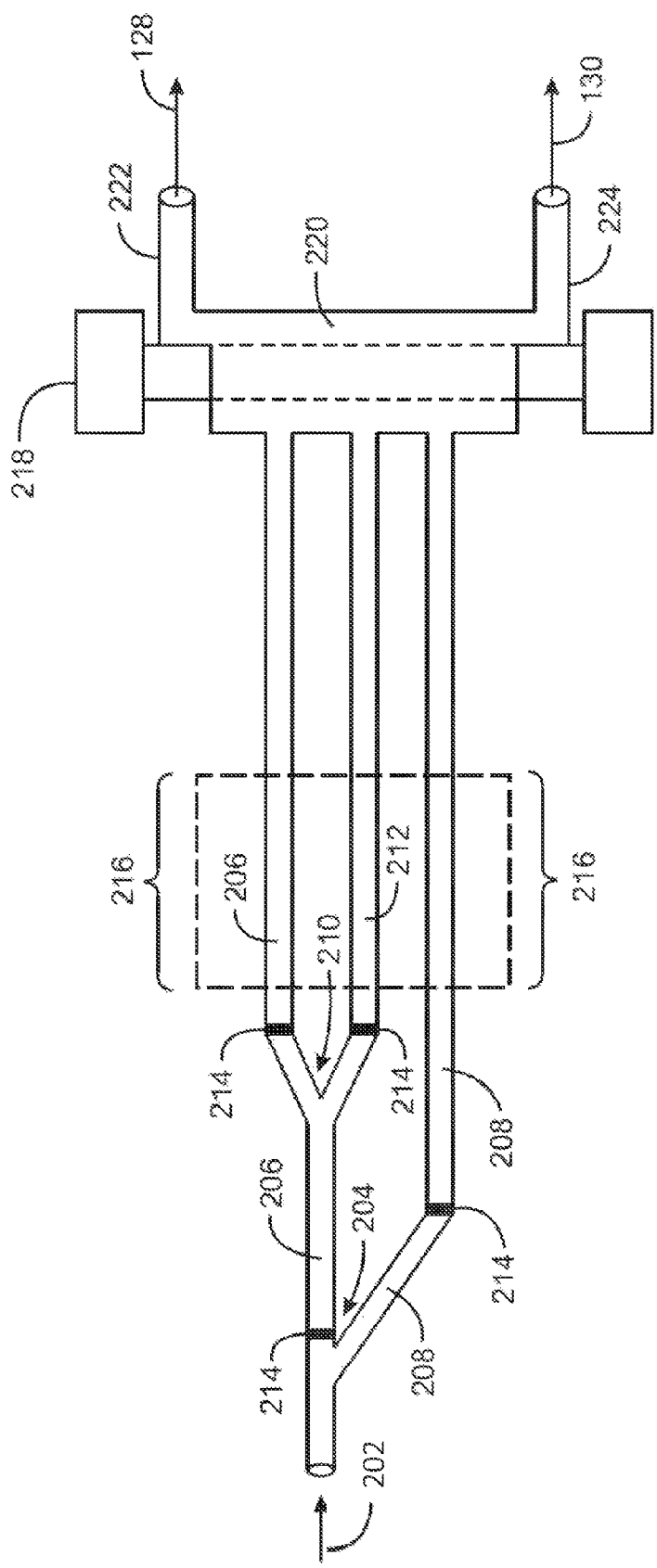
FIG. 2 is a side view schematic diagram of an exemplary multiphase separation system.

FIG. 2 shows an elevation drawing of an exemplary multiphase separation system 200. A multiphase fluid flows into the multiphase separation system 200 at a distribution inlet line 202. The multiphase separation system 200 is split vertically at a first divider 204 into a predominately oil line 206 and predominately water line 208. The predominately oil line 206 is split vertically at a second divider 210 of the multiphase separation system 200 into a predominately oil line 206 and an oil/water emulsion line 212. The predominately oil line 206, predominately water line 208, and oil/water emulsion line 212 lines may be of equal or lesser diameter than the distribution inlet line 202. In this example, perforated baffles 214 with a preselected open area can be used to balance the flow between the lines 206, 208, and 212. The locations of the perforated baffles 214 are downstream of the flow dividers 204 and 210. The perforated baffles 214 also act as flow straightening devices downstream of the flow dividers 204 and 210. In order to balance the flow and ensure sufficient residence time within each line, a range of open areas may be used for the perforated baffles 214.

After the open pipe sections 216 of the multiphase separation system 200, the lines 206, 208, and 212 enter a control volume 220. A level detector 218 that can determine phase interfaces, such as an oil/water interface, an oil/emulsion interface or an emulsion/water interface, may be installed in the control volume 220. The level detector 218 can be configured to send, for example, gamma radiation through the fluids in the control volume 220 in order to measure where the interfaces between the oil, water, and emulsion exist. This measurement indicates the quantity of water and quantity of oil that are present within the control volume 220. The level detector 218 can be configured to send a signal to a controller (not shown) which can adjust control valves or pump speeds (not shown) that are in the oil and water outlet lines. The control valves or pump speeds are configured to effectively control the flow rate of each line leaving the control volume 220.

A substantially pure oil stream 128 may be removed from the outlet 222 at the top of the control volume 220, while a substantially pure water stream 130 may be removed from the outlet 224 at the bottom of the control volume 220.

In another embodiment, the control volume 220 can be configured as a spherical or horizontal cylindrical separator (not shown). Additionally, the multiphase separation system 200 can be considered a tubular configured to flow a multiphase fluid and achieve phase separation.

Figure 3:
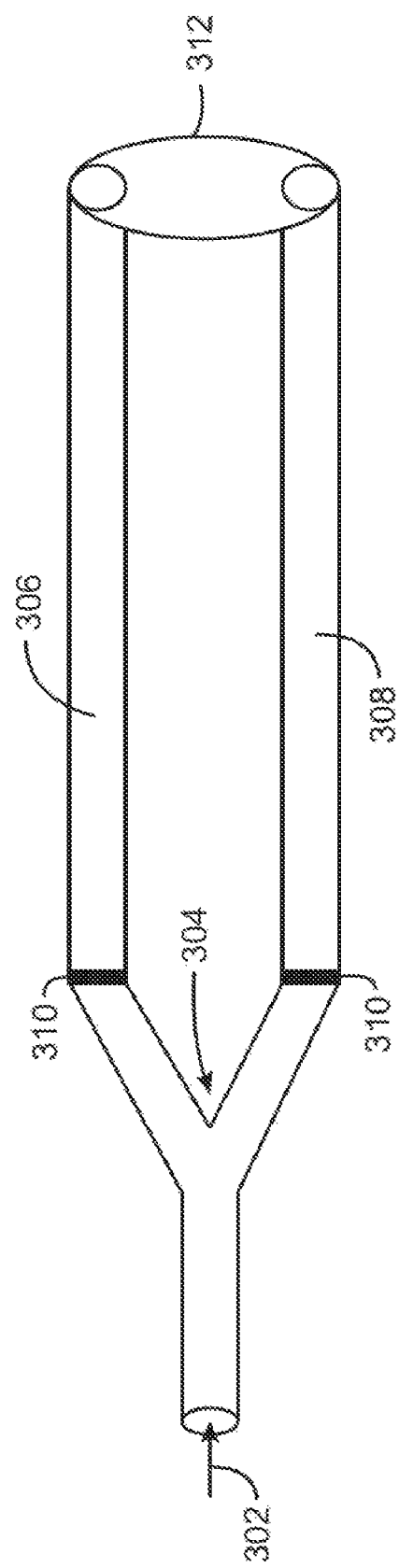
FIG. 3 is a top view schematic diagram of the exemplary multiphase separation system of FIG. 2, illustrating a horizontal divider in the multiphase separation system.

FIG. 3 is a top view of the exemplary multiphase separation system 300 illustrating a horizontal divide 304 in the multiphase separation system 300. The multiphase separation system 200 may include a distribution inlet line 302 configured to feed the multiphase fluid into separate lines 306 and 308. The distribution inlet line 302 can be coupled to a left line 306 and a right line 308 that are first split horizontally at divide 304. The left line 306 and the right line 308 can be parallel to the distribution inlet line 302. The flow in each line can be influenced by perforated baffles 310 installed within the lines. Subsequent lines (not shown) can be divided vertically to achieve greater separation of the oil phase and the water phase, to slow respective flow rates, and to meet at different levels in a control volume 312. In alternative embodiments, each of the horizontally split lines 306 and 308 may be configured to feed an independent control volume, where each control volume could then be smaller in size than one volume of all the commingled flow lines.

The multiphase separation system 300, splits flow into lines 306 and 308, for the separation of oil, water, and emulsion. Liquid degassing can also be accomplished in the lines 306 and 308 or a previous section, depending on the application. Downstream of the lines 306 and 308 and following bulk separation of the oil and water phases, the multiphase separation system 300 is connected to plurality of vertically-oriented dividers, which can be arranged at right or oblique angles, leading to a predominantly oil line and a predominantly water line. The predominately oil line is above the plane of the distribution inlet line 302, while the predominately water line is below the plane of the distribution inlet line 302. An oil/water emulsion line can also be located between the upper and lower lines, and is not shown in FIG. 3. The planes of both lines 306 and 308 are substantially parallel to each other and the distribution inlet line 302, e.g., they are in horizontal planes. This arrangement can achieve more pure oil and water outlet qualities leaving the multiphase separation system 300, compared to a single-line horizontal pipe separator. The left 306 and right 308 lines may be of equal or lesser diameter than the distribution inlet line 302.

The schematic of FIG. 3 is not intended to indicate that the multiphase separation system 300 is to include all of the components shown in FIG. 3. Further, any number of additional components may be included within the multiphase separation system 300, depending on the details of the specific implementation.

Figure 4:
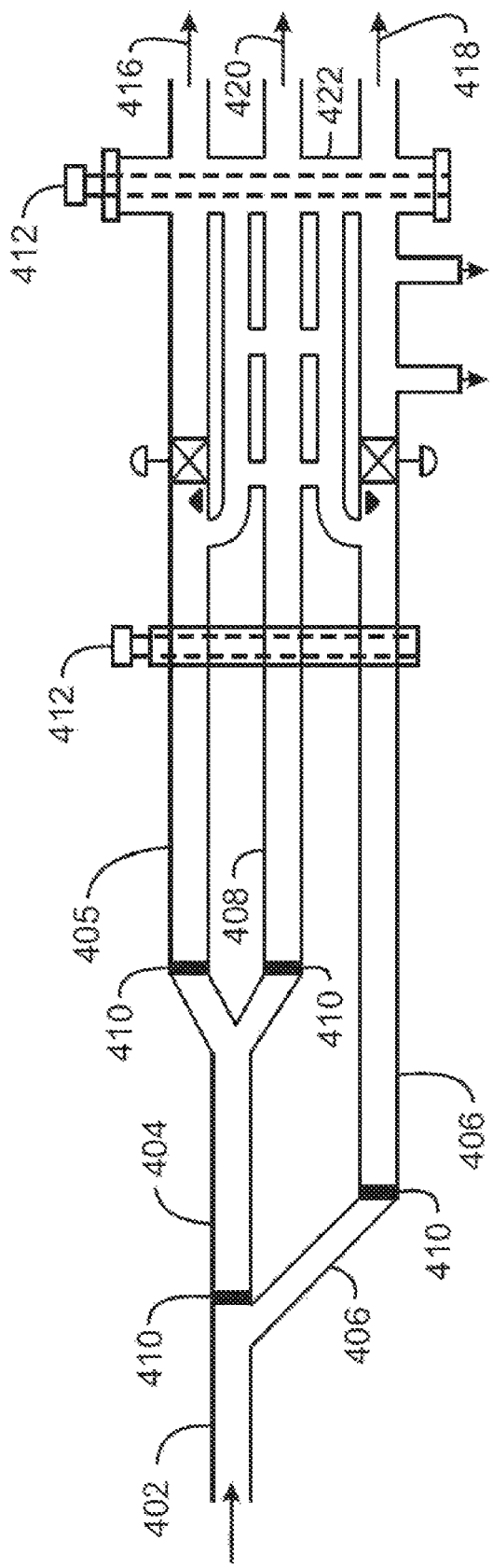
FIG. 4 is a side view schematic diagram of another multiphase separation system, as described herein.

FIG. 4 is a perspective view of another multiphase separation system 400, as described herein. In FIG. 4, a polishing section is located after the first level detector and before the control volume. The polishing section is discussed in more detail with respect to FIG. 5. In the multiphase separation system, 400, the distribution inlet line 402 divides into a middle line 404, in which oil is the predominate phase, and a lower line 406, in which water is the predominate phase. The middle line 404 may feed the multiphase fluid into an upper line 405 and an oil/water emulsion line 408. Perforated baffles 410, or other flow control devices, can be inserted at various positions within each line in order to balance the flow rate of fluid within a particular line. The upper line 405 can be in a second plane that is above and substantially parallel to the plane occupied by the oil/water emulsion line 408. The lower line 406 can be below and substantially parallel to the plane occupied by the oil/water emulsion line 408. In addition, the lower line 406 may feed water and sand particles into a downcomer (described with more detail in FIG. 5).

A level detector 412 is configured to measure the phase interface levels between the oil, water, and emulsion components in each of the lines 405, 406, and 408. The phase interface levels that are measured can be communicated to a controller that is configured to control downstream valves in the upper 405 and lower 406 lines. The valves are used to control the flows entering the control volume 422. In an exemplary embodiment, the control volume 422 is a vertically-oriented cylindrical structure that is configured to flow substantially oil through an oil outlet 416, substantially water through a water outlet 418, and an oil/water emulsion through an optional emulsion outlet 420. In another exemplary embodiment, the control volume 422 can be spherical in shape, and the multiphase separation system 400 can act as a pre-separator. In yet another embodiment, the control volume 422 can be a horizontal, oil-water separator. Spherical and vessel-based control volumes may be utilized when internal and external pressures are not a significant constraint on the system.

The schematic of FIG. 4 is not intended to indicate that the multiphase separation system 400 is to include all of the components shown in FIG. 4. Further, any number of additional components may be included within the multiphase separation system 400, depending on the details of the specific implementation. For example, the length of the lines 405, 406, and 408 can be extended, upstream of or within the polishing section 502 of FIG. 5, to increase residence time and improve oil/water separation. This may allow for the enhancement or the elimination of downstream separation steps and equipment. Near the end of the multiphase separation system 400, the flow will be directed into separate headers through a polishing section 502.

Figure 5:
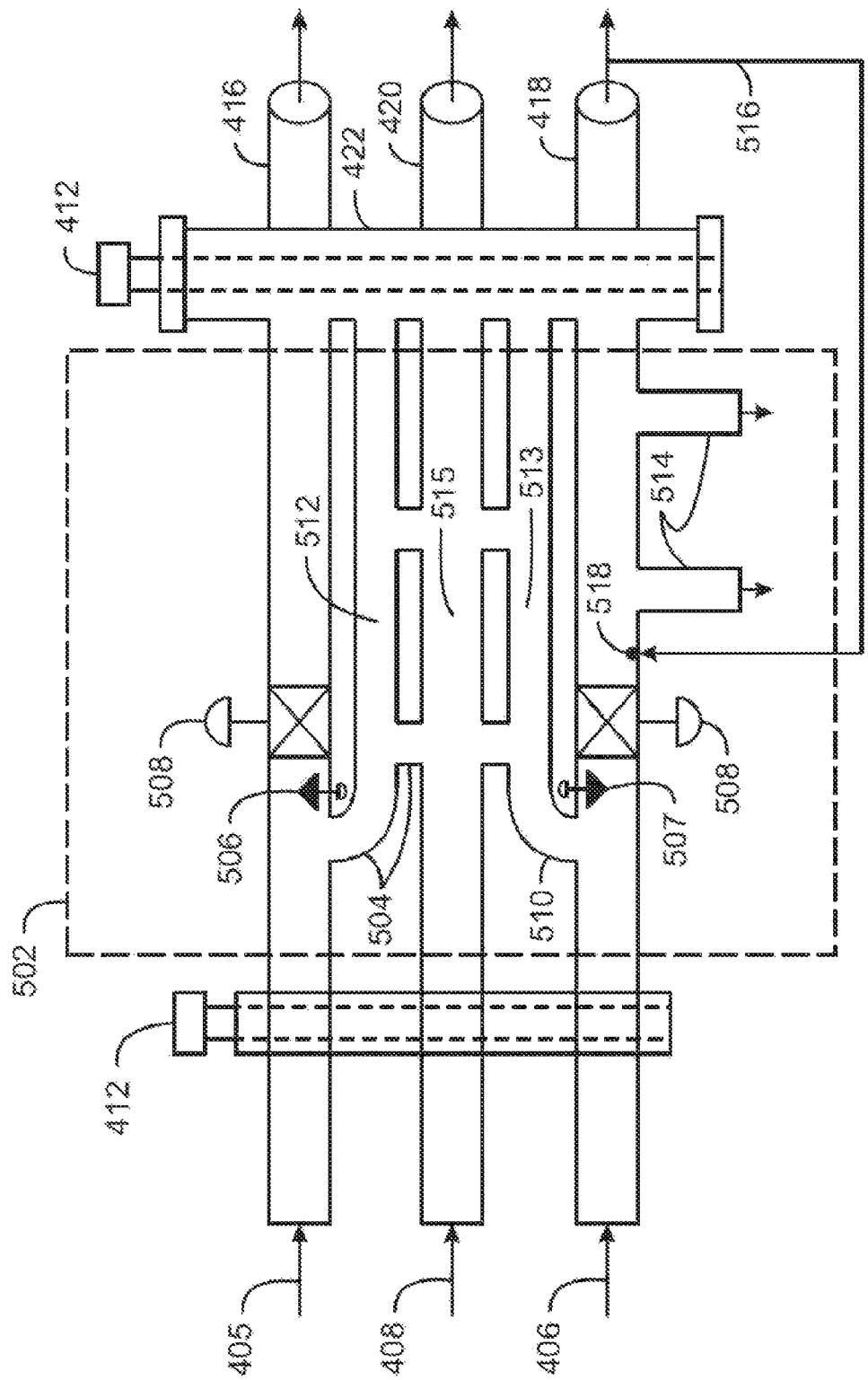
FIG. 5 is a side view schematic diagram of the multiphase separation system of FIG. 4.

FIG. 5 is a side view of the multiphase separation system 500, e.g., the multiphase separation system 400 of FIG. 4. In FIG. 5, the polishing section 502 is magnified and illustrated in more detail. Like numbered items are as discussed with respect to FIG. 4. Fluid flowing from the upper line 405, the lower line 406, and the oil/water emulsion line 408 pass by a level detector 412 and into the polishing section 502. Fluid from the upper line 405 enters the polishing section 502 and flows partially over an optional weir 506. The weir 506 for the upper line is configured to allow the less dense oil phase to flow above the weir 506. The more dense water and oil/water emulsion phases build-up against the weir 506 and flow through a downcomer 504 and into the oil/water emulsion lines 512 of the polishing section 502. A control valve 508 is configured to control the flow of the upper line 405 upstream of the control volume 422.

Another optional weir system 507 can be utilized in the lower line 406 to allow the more dense water phase to flow below the weir 506. The less dense oil and oil/water emulsion phases build-up against the weir 507 and flow through a riser 510 and into the oil/water emulsion lines 512 of the polishing section 502. Another control valve 508 is configured to control the flow of the lower line 406 upstream of the control volume 422. The downcomers 504 between the emulsion lines 512 are further configured to flow the more dense water component down to the lower emulsion line, and flow the less dense oil component up to the upper emulsion line.

The polishing section 502 is configured to allow the oil phase to enter at the top of the control volume 422, and exit through an outlet 416 at the top of the control volume 422. The polishing section 502 is also configured to allow the water phase to enter at the bottom of the control volume 422, and exit through an outlet 418 at the bottom of the control volume 422. The polishing section 502 is also configured to allow the oil/water emulsion phase to enter at the middle of the control volume 422, and exit through an optional outlet 420 at the middle of the control volume 422.

In an exemplary embodiment, the control volume 422 is a vertically-oriented cylindrical structure with inlets from each upper oil 405, lower water 406, and middle oil/water emulsion 512 lines, as well as oil 416, water 418, and oil/water emulsion 420 outlets. The outlets can connect to downstream polishing separation stages, e.g., deoiling hydrocyclones.

To enhance the oil/water separation prior to the fluid from each line being flowed through the polishing section 502, the oil and oil/water emulsion lines can be equipped with optional electrostatic coalescer devices (not shown) for enhanced water droplet coalescence and oil/water separation. The oil, water, and oil/water emulsion lines can be equipped with coalescing and flow distribution internals, e.g., plate packs, perforated baffles, and the like, which enhance droplet coalescence and oil/water separation.

The level of oil and water in each of the lines 405 and 406 entering the polishing section 502 can be controlled with control valves 508 to maintain the oil/water interface either above or below the weir 506 height such that an insignificant amount of oil/water emulsion flows downstream through the lines. The oil/water emulsion can be forced to flow into an oil-continuous emulsion line 512, a water-continuous emulsion line 513, and an oil/water emulsion line 515. The emulsion lines 512, 513, 515 are allowed to communicate with one another to allow free droplets to migrate to their respective phases via the downcomers 504, and the risers 510.

Additional downcomers can be connected to the lower line 406 as sand traps 514 to capture sand that accumulates in the multiphase separation system 400. The sand traps 514 can be sealed by a sand boot (not shown). The sand boot can be configured with sand transport internals to allow a preset amount of sand to accumulate before the sand boot is emptied. Upstream of the sand boot, an optional sand jet system may be activated to inject flush water into the lower line 406 from a recycle stream 516 at injection point 518. The sand jet system may be used to flush the accumulated sand from the lower line 406 into a sand trap 514. In some embodiments, multiple sand traps 514 can be utilized to capture sand from the lower line 406.

Upon entering the control volume 422, the polishing section 502 will have separated the multiphase fluid into three components, a predominately oil upper line 405, a predominately water lower line 406, and multiple middle lines 512 that are an oil/water emulsion. In this exemplary embodiment, the control volume 422 is oriented vertically.

Figure 6A:
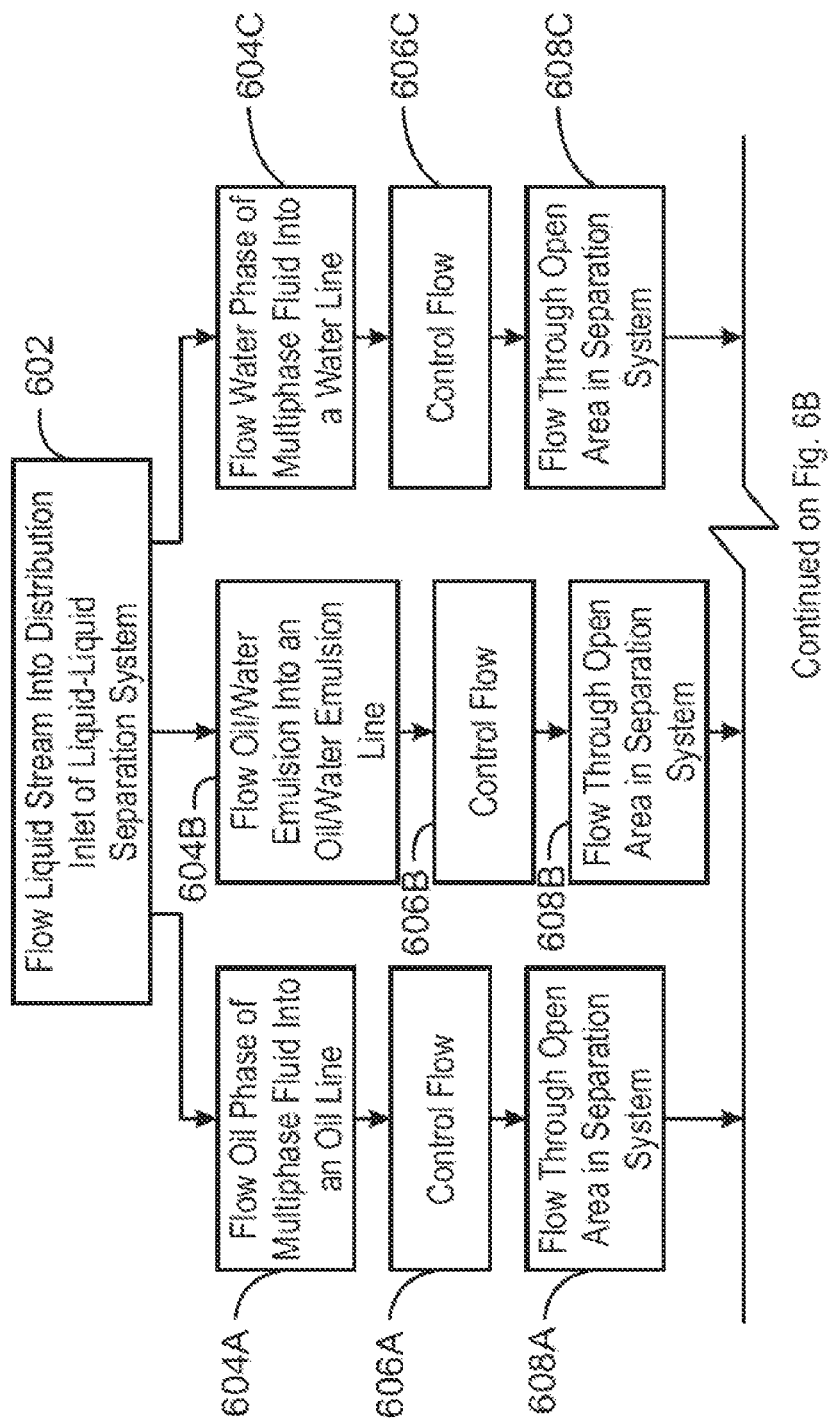
FIGS. 6A and 6B illustrate a process flow diagram showing a method for separating liquids within a multiphase fluid.
Figure 6B:
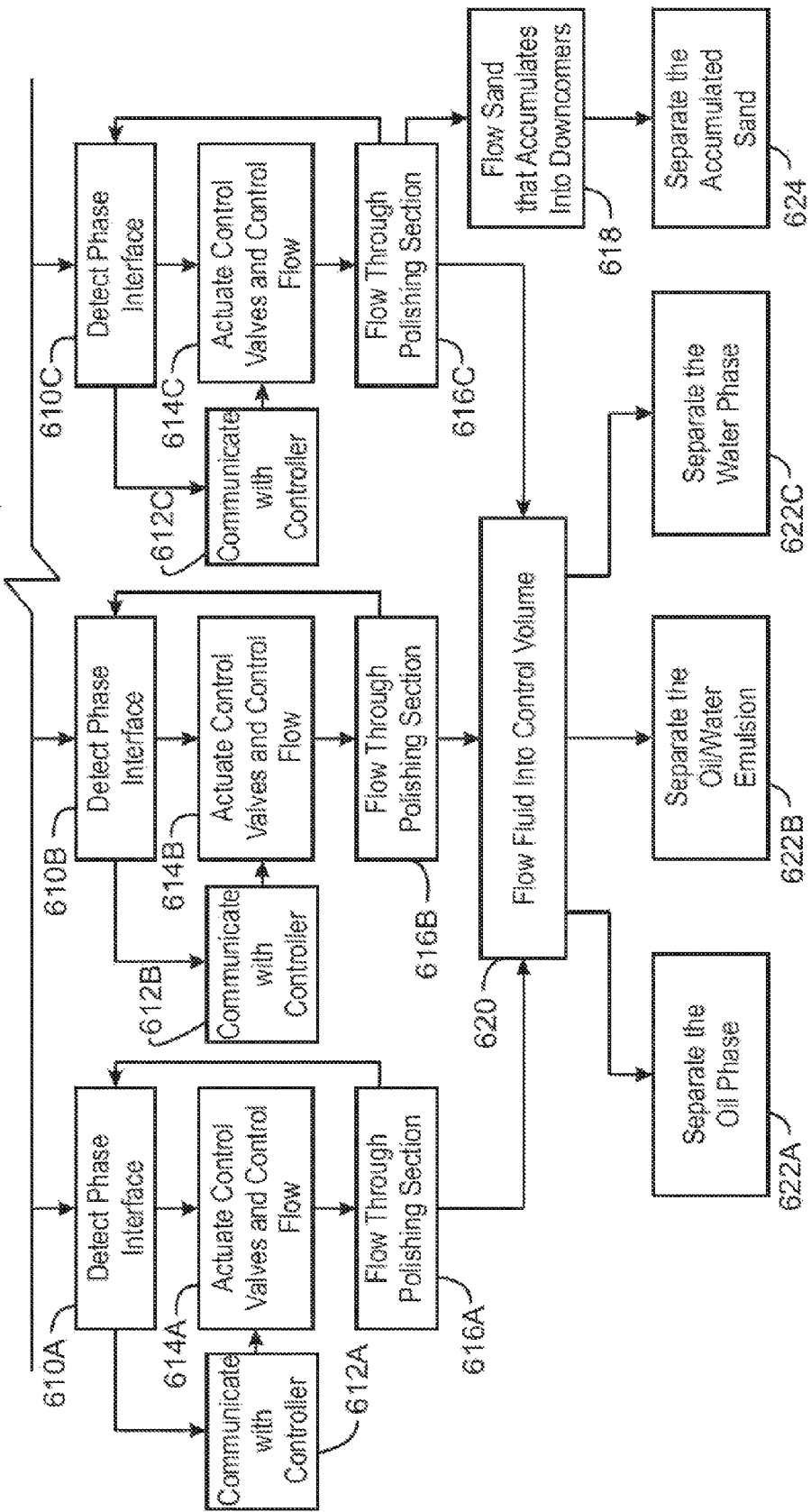

FIGS. 6A and 6B are a process flow diagram of a method 600 for separating liquids within a multiphase fluid. In various embodiments, the multiphase separation system 200 and 400 discussed above with respect to FIGS. 2 and 4 is used to implement the method 600.

An optional gas-liquid separation process (not shown) can be used upstream of the current method. This separation step separates gases from the production fluid. Here, the multiphase fluid is flowed into the distribution inlet of a gas-liquid separation system. The multiphase fluid can be separated into gases and liquids within the gas-liquid separation system. The gas stream can be flowed above the liquid stream into a gas outlet. The gases are substantially separated from the liquid stream, and the liquid stream continues on in the main process described below, starting at block 602.

The method 600 begins at block 602, at which the multiphase fluid is flowed into a distribution inlet of the separation system. The multiphase fluid may be separated in vertically oriented distribution headers, and flow into a predominately oil line at block 604A, an oil/water emulsion line at block 604B, and a predominately water line at block 604C.

The flow split of each line is controlled at 606A, 606B, and 606C using, for example, perforated baffles. Each line can flow through an open pipe section in the separation system, indicated at blocks 608A, 608B, and 608C. The open pipe sections can be configured to allow for a particular residence time for the fluid in each line. A set residence time can be used that provides the most effective separation in the open pipe sections of the multiphase fluid in the separation system.

At blocks 610A, 610B, and 610C, level detection is made by a level detector that is configured to sense a phase interface in each line of the separation system. The oil, water, and oil/water emulsion levels that are detected by the level detector can be communicated to a control system. At blocks 612A, 612B, and 612C, communication is made to a controller that is configured to energize an actuated control valve. At blocks 614A, 614B, and 614C, the control valve is subject to the signals from the controller in communication with the level detector. Upon entering the polishing section, the flow of each line is controlled by the control valves based upon the signals from the controller in communication with the level detector at blocks 616A, 616B, and 616C. As levels of oil, water, and oil/water emulsion are detected in each line by the level detector, the controller will receive signals corresponding to those levels and the control valves will be actuated accordingly.

Further, the predominately water line can be equipped with optional sand boots, which are cylindrical volumes oriented perpendicular to the horizontal water line for the collection and drainage of sand from the produced fluid in the lines. The water line includes predominately water, and to increase flow this water line can be equipped with recycle inlet streams or a sand jet system for fluidizing and flushing sand into the sand boots. At block 618, the sand that accumulates in the water line can be flowed into downcomers, and effectively separated. Since this occurs in the predominately water line, this can be accomplished without significantly disturbing the bulk oil/water separation in the polishing section. Additionally, downstream sand handling systems, including use of produced water sand cyclones and an accumulation system, can be implemented to flush sand and other solid particles from the multiphase separation system. The sand boots can optionally be equipped with sand transport internals to fluidize and remove sand collected in the bottom of the boots.

At block 620, the oil, water, and oil/water emulsion lines of the multiphase separation system are flowed into a control volume, where the oil, water, and emulsion interface levels are controlled. The oil, water, and emulsion are separated in the control volume. At blocks 622A, 622B, 622C, the oil phase, water phase, and oil/water emulsion are separated using the method disclosed herein. The sand that accumulates in the multiphase separation system is removed at block 624 by techniques described herein.

The process flow diagram of FIG. 6 is not intended to indicate that the steps of the method 600 are to be executed in any particular order, or that all of the steps of the method 600 are to be included in every case. Further, any number of additional steps not shown in FIG. 6 may be included within the method 600, depending on the details of the specific implementation.

Figure 7:
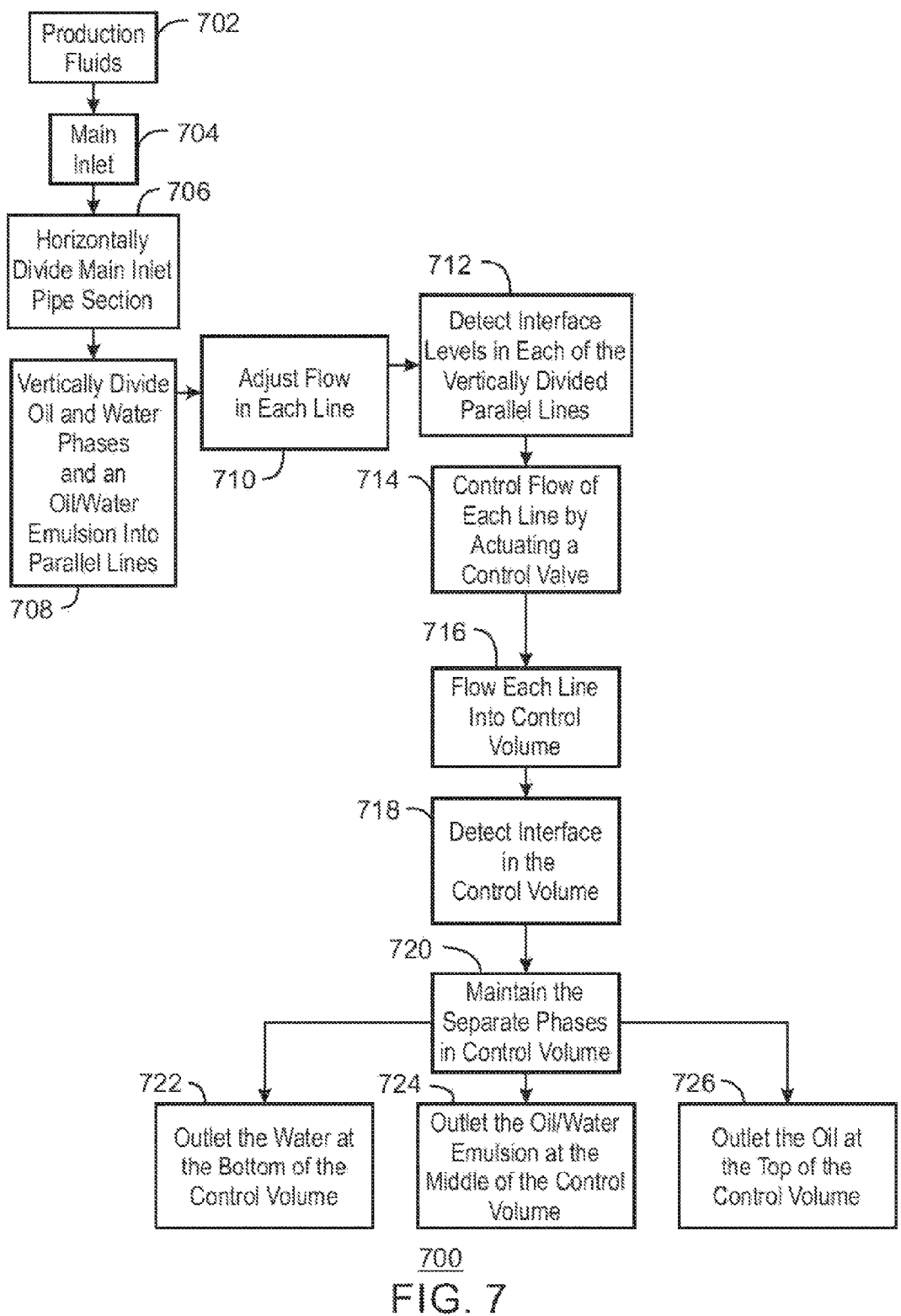
FIG. 7 illustrates a block diagram of an exemplary separation system, and includes a control system.

FIG. 7 illustrates a block diagram of an exemplary multiphase separation system 700, and includes a control system. Production fluids 702 are flowed through a main inlet 704. The fluids are first divided horizontally 706 and further divided vertically 708 to achieve separation, at least to some extent, of oil, water and oil/water emulsion into three separate lines in the vertical plane. The flow can be adjusted in each line 710 using, for example, perforated baffles, weir structures, valves, or pumps that create a marginal pressure drop in each line. The perforated baffles are intended to distribute the liquid flow evenly over a particular cross-section, and to aid in the separation of the multiphase production fluids 702. The perforated baffles can optionally be raised and lowered when coupled to gate valves that control the exposure of the baffle, or adjust the open area of the baffle.

After each line extends through an open pipe section, where the length of each open pipe section is configured to achieve optimal separation and residence time of the fluids within the multiphase separation system 700, the oil, water, and oil/water emulsion phase interface levels are detected by a level detector 712. The flow of each line is then controlled 714 by communicating the oil, water, and oil/water emulsion levels, as detected by the level detector, to a controller that controls downstream control valves. The control valves can be actuated 714 based on the previous phase level detection made by a level detector, thereby controlling the flow of each line within the polishing section. The aim of the control scheme is to force the oil/water emulsion from each line into a middle section, thus allowing for greater separation of the oil and water phases in the multiphase production fluids 702.

After the polishing section, each line can be flowed into the control volume 716. The oil and water interface levels can be detected by a level detector in the control volume 718. This level can be communicated to a separate controller and subsequent control valves, or pumps, downstream of the control volume that can be actuated in order to control the outlet of each line 722, 724, and 726 from the control volume. Optional steps at 720 include adjusting the height of a weir system that can be used upstream of the control volume to more efficiently separate the components of the multiphase fluid. The weir system can be stationary, or it can be coupled to a gate valve system and the height of the weir can be adjusted. Further, a polishing section with multiple downcomers and risers is an optional addition to assist in further separation before the fluid in each line flows into the control volume.

Separation between the water and oil phases is maintained within the control volume at 720. A level detector within the control volume detects the level of oil and water present within the control volume. The volume of each phase within the control volume may vary depending on the oil/water interface level that is detected. Ultimately, the control volume is configured with a water outlet at the bottom 722, an oil outlet at the top 726, and optionally an oil/water emulsion outlet at the middle 724 of the control volume. The optional third outlet of oil/water emulsion can be further processed downstream of the control volume to achieve desired separation of the oil and water phases.

Figure 8:
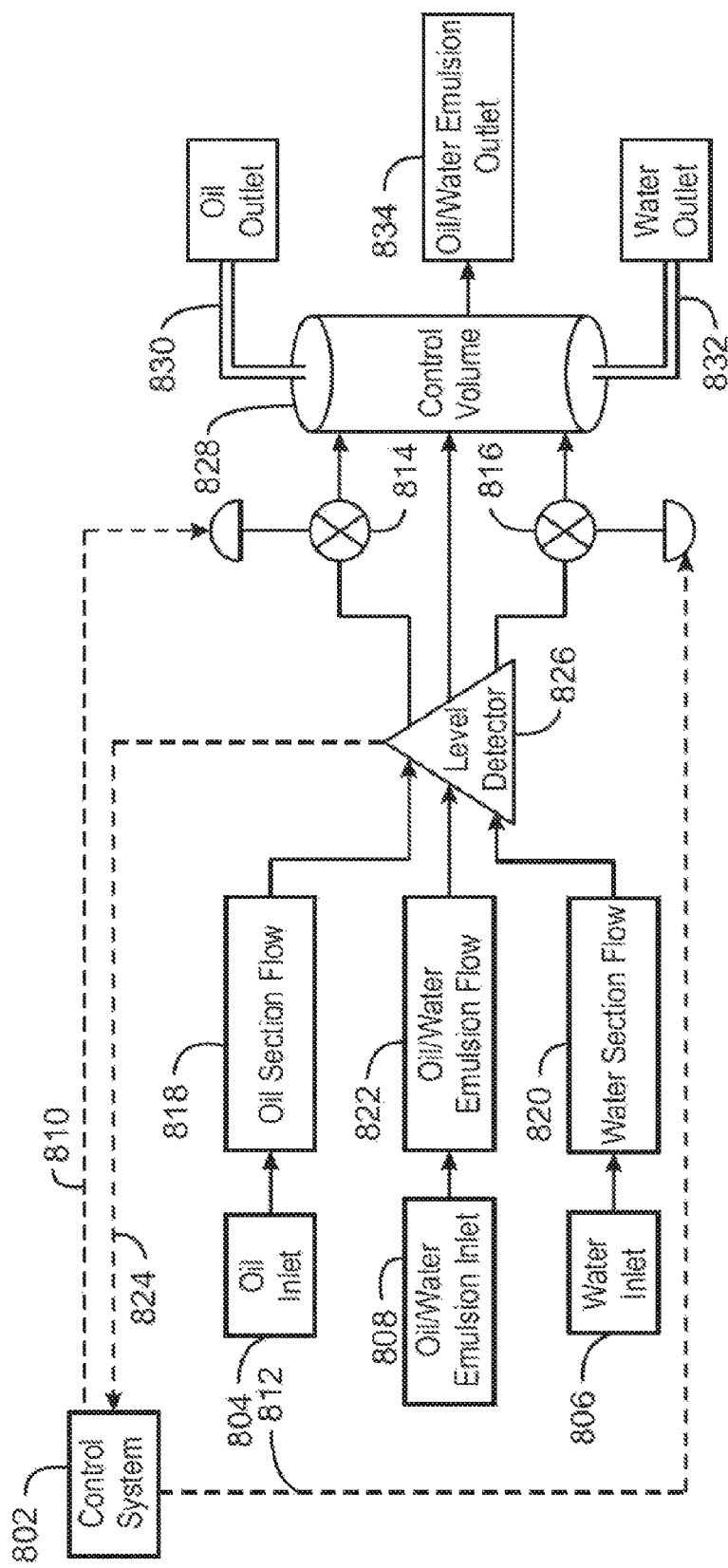
FIG. 8 is a schematic view of a multiphase separation system and control system.

FIG. 8 is a schematic view of a multiphase separation system 800 and control system 802. The control system 802 is configured to flow fluid from an oil inlet 804, a water inlet 806, and an oil/water emulsion inlet 808 of the multiphase separation system 800 at a preferred rate. The multiphase separation system 800 uses the control system 802 to send control signals 810 and 812 to each of the control valves 814 and 816 controlling the fluid flowing in the multiphase separation system 800. The control system 802 may be part of a larger control system, such as a distributed control system (DCS), a programmable logic controller (PLC), a direct digital controller (DDC), or any other appropriate control system. Further, the control system 802 may automatically adjust parameters via the controller outputs 810 and 812, or may provide information about the multiphase separation system 800 to an operator who then manually inputs adjustments.

The control system 802 sends a signal 810 to control valve 814 to control the oil section flow 818. Similarly, a control signal 812 is sent to control valve 816, which can adjust the flow rate of the water section flow 820. The oil/water emulsion flow 822 can optionally be controlled by a control valve (not shown) to control flow from an oil/water emulsion inlet 808. Another control signal 824 can be sent from the level detector 826 to the control system 802, which provides input to the control system 802 to send signals 810 and 812 to control valves 814 and 816.

The control valves 814 and 816 are configured to regulate the fluid velocity in the oil section flow 818 and the water section flow 820, which ultimately lead into a polishing section. The control valves can indirectly control the oil/water emulsion section flow 822 in the polishing section. The interface level, for example, between oil and water phases or between either an oil phase or a water phase and an emulsion phase, can be detected in the sections 818 and 820 at the level detector 826, and the control signal 824 can be sent to the control system 802 corresponding to the interface levels that are detected. The control system 802 is configured to control the flow of each section 818, 820, and 822 into a polishing section, with the water and oil/water emulsion in the oil section flow 818 being forced through downcomers into a middle section (not shown), and with the oil and oil/water emulsion in the water section flow 820 being forced through risers into a middle section (not shown). The control volume 828 is configured to flow substantially oil from an oil outlet 830 at the top of the control volume, substantially water from a water outlet 832 at the bottom of the control volume, and optionally an oil/water emulsion from an oil/water emulsion outlet 834 at the middle of the control volume.

It will be understood that multiphase separation system 800 shown in FIG. 8 has been simplified to assist in explaining various embodiments of the present techniques. Accordingly, in embodiments of the present techniques numerous devices not shown or specifically mentioned can further be implemented. Such devices can include flow meters, such as orifice flow meters, mass flow meters, ultrasonic flow meters, venturi flow meters, and the like. Additionally, the flow at each outlet from the control volume 828 can be controlled by subsequent process equipment (including pumps through pump speed control, and control valves) located downstream of the control volume 828.

Figure 9:
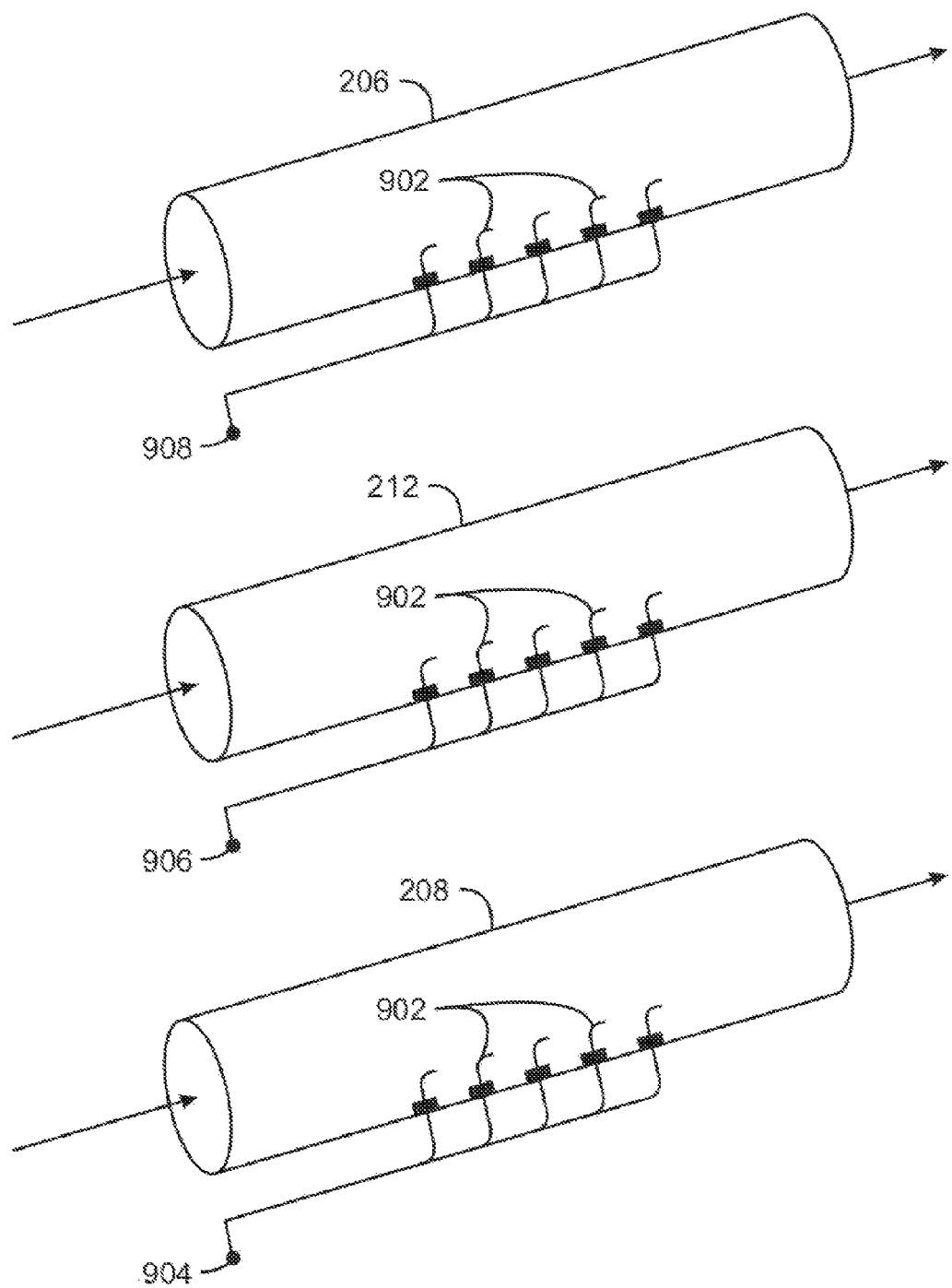
FIG. 9 is a perspective drawing illustrating the upper, middle and lower lines with injection points for sand jet nozzles and recycle streams.

FIG. 9 is a drawing illustrating the upper, middle and lower lines with injection points 900 for sand jet nozzles and recycle streams. Like numbered items are as discussed with respect to FIG. 2. Injection points 902 for sand jet nozzles and recycle streams can be installed in a line of the injection recycle system, which can be a part of the multiphase separation system 200 of FIG. 2. There can be a single nozzle for jetting a fluid stream down a particular line, for instance, recycled water from the control volume outlet can be recirculated to the predominately water line 208 of FIG. 2 to fluidize accumulated sand in the multiphase separation system 200 of FIG. 2 and flush the accumulated sand through downcomers into sand boots. Nozzles (not shown) can also be used for recycled flow to influence the flow of a particular line of the separation system 200 of FIG. 2. To limit the effect on oil/water separation, recycle lines 904, 906, and 908 can be configured to be on the exterior of the upper, middle and lower lines.

Figure 10A:
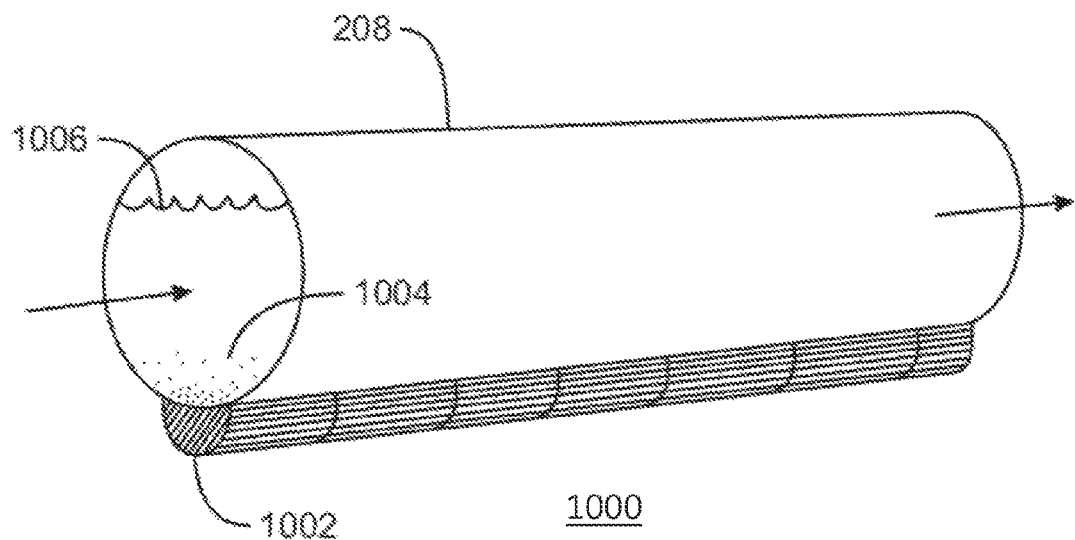
FIG. 10A is a perspective drawing illustrating the water line with a collection area at the bottom of the line for solid particles to accumulate.
Figure 10B:
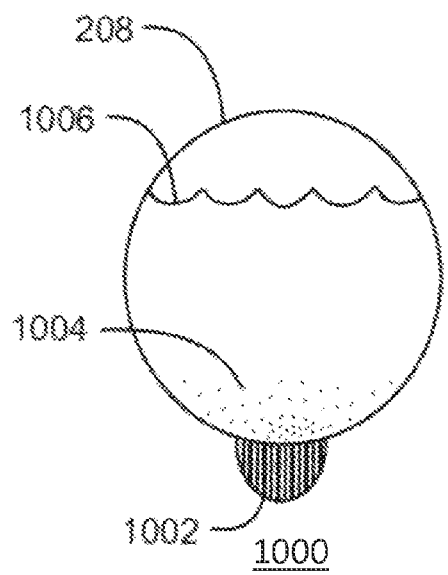
FIG. 10B is an end-view drawing illustrating the water line with a collection area at the bottom of the line for solid particles to accumulate.

FIGS. 10A and 10B are drawings illustrating the water line with a collection area at the bottom of the line for solid particles to accumulate. A perspective view FIG. 10A and a side view 10B of the sand accumulating system 1000 are shown. The water line 208 from FIG. 2 has an additional space at the bottom 1002 configured to capture the sand or other solid particulate matter 1004 that may settle from the fluid 1006 flowing in the line.

A design can be implemented where a portion of the tubular wall is configured outward and follows the length of the line, for example, in the general shape of a horseshoe or semi-circle. Sand or other solid particulate matter 1004 can accumulate inside the bottom area 1002 while the fluid 1006 flowing within the line remains more or less steady. Downcomers, either sloped or vertical, can be configured downstream of the bottom area 1002 to capture sand or other solid particulate matter 1004 for removal. A sand jet system and other means of fluidization can be installed in the water line 208 to increase flow and assist the jetting and fluidization of the accumulated sand or other solid particulate matter 1004, thereby facilitating separation via the downcomers.

Figure 11:
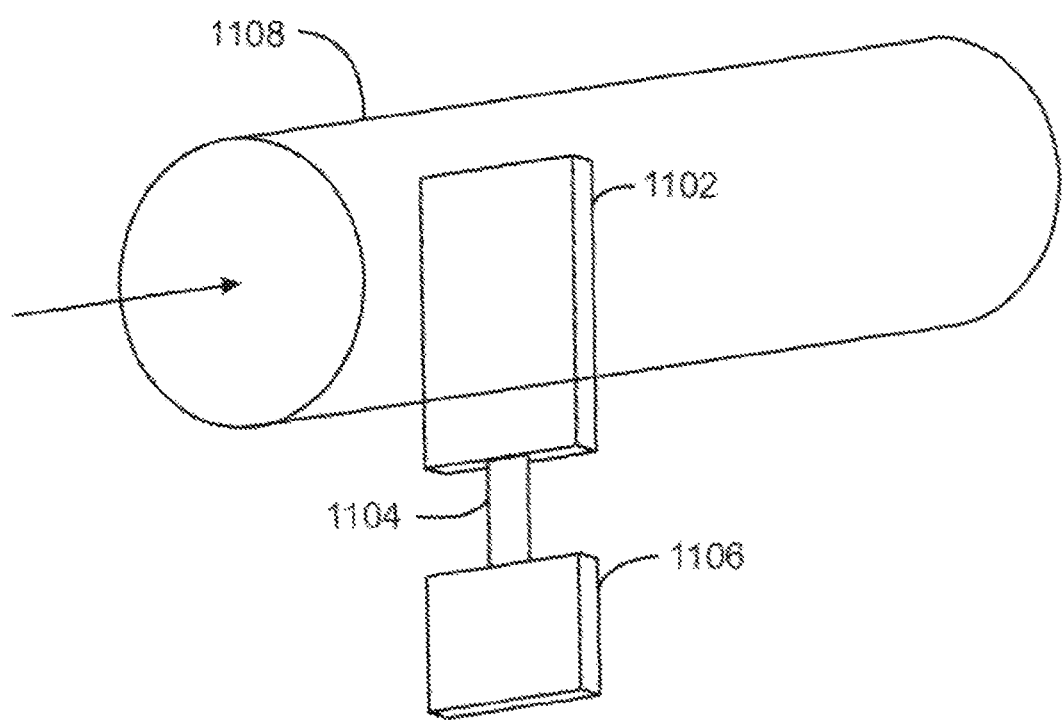
FIG. 11 is a perspective drawing illustrating an adjustable weir system.

FIG. 11 is a drawing illustrating an adjustable weir system 1100. The adjustable weir system 1100 includes an adjustable weir 1102 that is coupled via a coupling 1104 to a gate valve actuator 1106. The adjustable weir 1102 is inside a pipe 1108. The gate valve actuator 1106 can be actuated manually or by a controller (not shown) to adjust the height of the adjustable weir 1102. The adjustable weir 1102 for an oil line is configured to allow a less dense oil phase to flow above the adjustable weir 1102, while the more dense water or oil/water emulsion phase builds-up against the adjustable weir 1102 and flows through a downcomer and into the oil/water emulsion lines of the polishing section (not shown).

Similarly, an adjustable weir 1102 in a water line may be configured to allow the more dense water phase to flow below the adjustable weir 1102, while the less dense oil or oil/water emulsion phase builds-up against the weir and flows through a riser and into the oil/water emulsion lines of the polishing section (not shown). The adjustable weir 1102 can be actuated manually or based off measurements from the level detectors (not shown) that send signals to a controller. A controller of an exemplary control system (not shown) can control the gate valve actuator 1106, thereby adjusting the level of the adjustable weir 1102 based on a measured phase interface.

Figure 12:
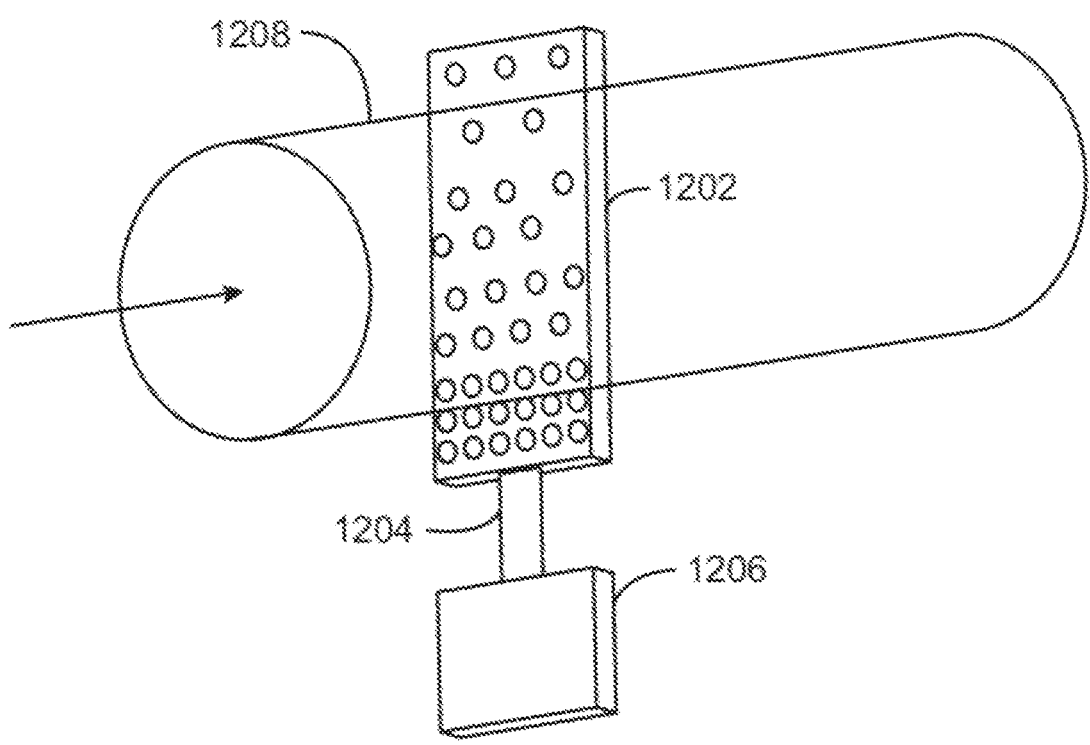
FIG. 12 is a perspective drawing illustrating an adjustable baffle system.

FIG. 12 is a drawing illustrating an adjustable baffle system 1200. The adjustable baffle system 1200 includes a perforated baffle 1202 coupled by a coupling 1204 to a gate valve actuator 1206. The perforated baffle 1202 is configured to be inserted within a pipe 1208. The perforated baffle 1202 has multiple sections with different open area. At one end of the perforated baffle 1202, the open area may be low, while at the other end the open area may be high. The section of the perforated baffle 1202 that is inserted into the pipeline 1208 can be adjusted manually or by a controller (not shown) in communication with a flow meter (not shown) and the gate valve actuator 1206. The gate valve actuator 1206 can be configured to adjust the section of the perforated baffle 1202 that is inserted into the pipeline 1208 based on the measured flow rate of a particular pipeline. Adjusting the perforated baffle 1202 in this way helps ensure more efficient separation between the oil and water phases of production fluids.

Figure 13:
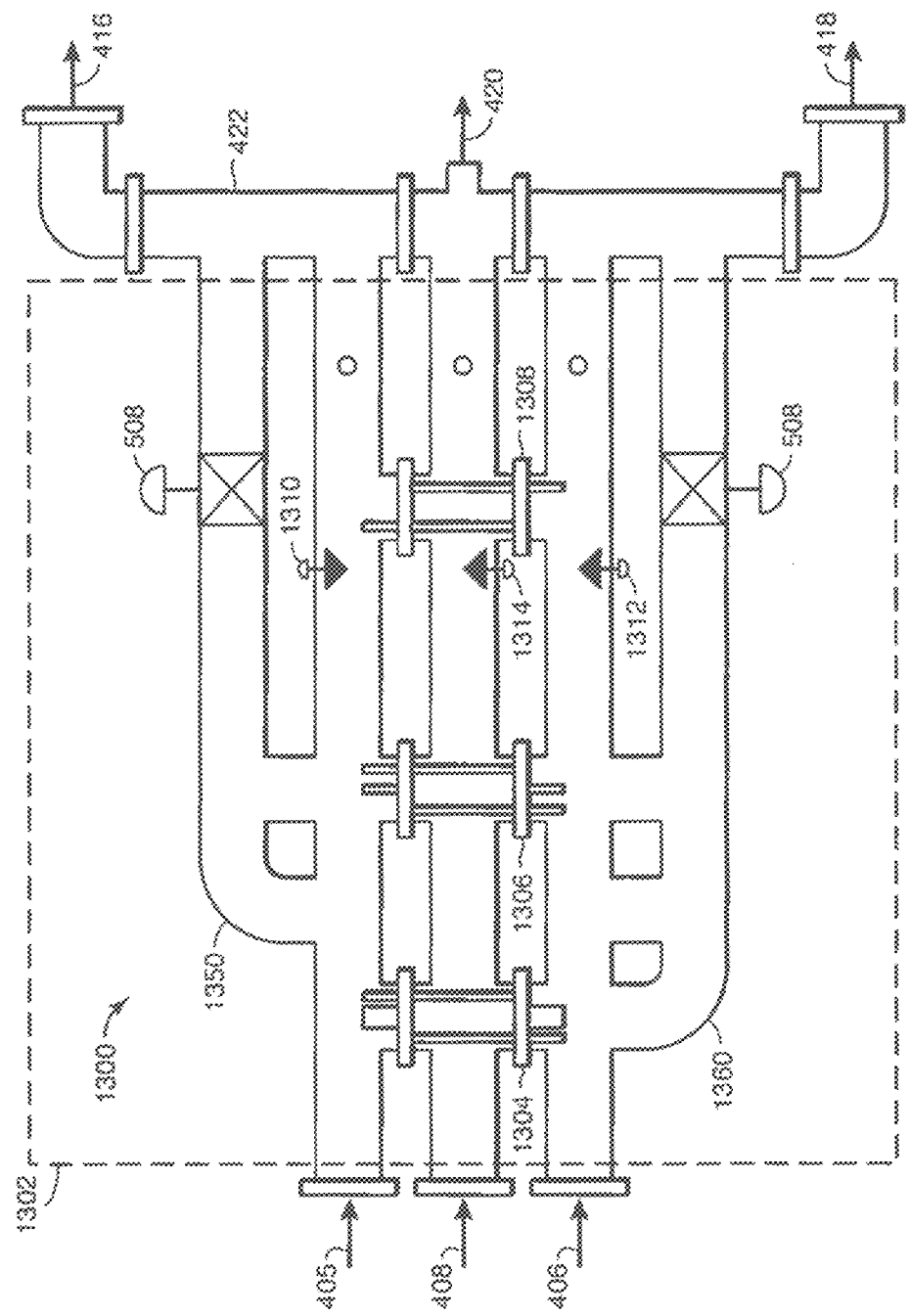
FIG. 13 is a side view schematic diagram of another embodiment of a multiphase separation system.

FIG. 13 is a side view of another embodiment of the multiphase separation system 1300, e.g., the multiphase separation system 200 of FIG. 2 or 400 of FIG. 4. This embodiment of the multiphase separation system 1300 employs the comparatively close proximity of the lines 405, 406, and 408, wherein the lines 405, 406, and 408 are located substantially adjacent to one another with no intervening parallel lines, pipes, or other conduits. The comparatively close proximity of the lines 405, 406, and 408, which minimizes amount of recirculation in the multiphase fluid, e.g., at dividers 204 and/or 210 of FIG. 2, may be beneficial to reduce remixing and/or facilitate phase separation in the lines 405, 406, and 408. In FIG. 13, the polishing section 1302 is magnified and illustrated in more detail. Like numbered items may be substantially the same as discussed with respect to FIGS. 4 and 5. Fluid from the upper line 405 enters the polishing section 1302. An oil header 1350 is depicted and may generally receive a stream comprising substantially oil from the upper line 405.

A weir 1310, e.g., as depicted in FIG. 15, may be optionally disposed in the upper flow line 405 to assist or otherwise encourage oil flowing up into the oil header 1350. As less dense oil builds up against the weir 1310, an increasing amount of oil may pass into the oil header 1350. A control valve 508 is configured to control the flow of the oil header 1350 upstream of the control volume 422. Another optional weir 1312, e.g., as depicted in FIG. 15, may be utilized in the lower line 406 to assist or otherwise encourage the more dense water phase to flow into the water header 1360. Another control valve 508 is configured to control the flow of the water header 1360 upstream of the control volume 422. A third optional weir 1314, e.g., as depicted in FIG. 15, may be utilized on the middle line 408 in addition to or instead of the weir 1312 to assist or otherwise encourage the more dense water phase to flow into the water header 1360. While the weirs 1310, 1312, and 1314 are depicted as connectable at flange couplings, those of skill will appreciate that other weir connection mechanisms, e.g., welding into place, etc., are well known and may be suitably utilized within the scope of this disclosure.

A novel system of downcomers/riser apparatuses 1304, 1306, and 1308, e.g., as depicted in and further described under FIG. 14, may be optionally employed to transfer water, oil, and/or emulsion between the parallel lines 405, 406, and 408 of the polishing section 1302. In some embodiments, the adjoining solid plates of the downcomers/riser apparatuses 1304, 1306, and 1308 are placed between flanged connections in the multiphase separation system 1300.

The polishing section 1302 is configured to allow the oil phase to enter at the top of the control volume 422, and exit through an oil outlet 416 at the top of the control volume 422. The polishing section 1302 is also configured to allow the water phase to enter at the bottom of the control volume 422, and exit through a water outlet 418 at the bottom of the control volume 422. The polishing section 1302 may also be configured to allow the oil/water emulsion phase to enter at the middle of the control volume 422 and exit through an optional emulsion outlet 420 at the middle of the control volume 422.

FIG. 14 is a perspective diagram of the downcomers/riser apparatuses 1304, 1306, and 1308, which may hereinafter be referred to individually as a downcomer/riser or a downcomer riser apparatus. The downcomers/riser apparatuses 1304, 1306, and 1308 may be useful to minimize remixing in the polishing section, e.g., due to open communication between the oil, emulsion, and water headers (e.g., in the lines 405, 406, and 408 in the multiphase separation system 400 of FIG. 4). The downcomer/riser 1304 may permit the passage of oil from the lower line 406 and/or the middle line 408 to the upper line 405 through riser(s) by operatively coupling a portion of the line comprising the oil phase(s) (e.g., a region above the oil/water interface) of the lower line 406 and/or the middle line 408 and that of the upper line 405. The downcomer/riser 1304 may permit the passage of water from the upper line 405 and/or the middle line 408 to the lower line 406 through downcomer(s) by operatively coupling a portion of the line comprising the water phase(s) (e.g., a region below the oil/water interface) of the upper line 405 and/or the middle line 408 to that of the lower line 406. The downcomer/riser 1304 is configured to prohibit, or at least substantially inhibit, all other exchanges of fluid between the lines 405, 406, and 408 by means of the adjoining solid plates which minimize remixing in the polishing section. The downcomer/riser 1306 may function in substantially the same manner as the downcomer/riser 1304 with the exception of the amount of oil and/or water passable through the downcomer/riser 1306 at the passages operatively coupled to the middle line 408, which may have a smaller diameter (and thus allow comparatively lesser flow) than the diameter of the downcomer/riser 1304 at the corresponding passages operatively coupled to the middle line 408. This configuration may accommodate relatively greater quantities of the oil, water, and/or emulsion to be passed from the middle line 408 to the upper line 405 and/or the lower line 406 at a location further upstream in the polishing section (e.g., via the downcomer/riser 1304 as depicted in FIG. 13) and relatively lesser quantities of the oil, water, and/or emulsion to be passed from the middle line 408 to the upper line 405 and/or the lower line 406 at a location further downstream in the polishing section (e.g., via the downcomer/riser 1306 as depicted in FIG. 13). The downcomer/riser 1308 is configured to permit the passage of oil from the lower line 406 to the upper line 405 by operatively coupling a portion of the line comprising the oil phase(s) (e.g., a region above the oil/water interface) of the lower line 406 and that of the upper line 405 and permit the passage of water from the upper line 405 to the lower line 406 by operatively coupling a portion of the line comprising the water phase(s) (e.g., a region below the oil/water interface) of the upper line 405 to that of the lower line 406. The downcomer/riser 1308 is configured to prohibit, or at least substantially inhibit, all other exchanges of fluid between the lines 405, 406, and 408 by means of the adjoining solid plates. Those of skill in the art will appreciate that alternate embodiments of the multiphase separation system 1300 may optionally utilize any of the downcomers/riser apparatuses 1304, 1306, and 1308 at any suitable location(s) in the polishing section 1302 of FIG. 13; other embodiments may omit one or more of the downcomers/riser apparatuses 1304, 1306, and/or 1308, reconfigure the downcomers/riser apparatuses 1304, 1306, and 1308, and/or add multiple downcomer/riser apparatuses of a similar design to obtain the desired operating characteristics within the scope of this disclosure.

Further, one or more of the downcomers/riser apparatuses 1304, 1306, and/or 1308 may be constructed in two separate corresponding, reciprocal, mirrored, and/or duplicate parts (e.g., as one or more vertical passages affixed to a pass-through solid plate) and coupled to form a single unit. When coupled, any such downcomer/riser embodiments need not be welded or otherwise tight-fitted, as to prohibit all exchanges of fluid, but should generally be configured to at least substantially prevent considerable bypass around the downcomer/riser assembly. The downcomers/riser apparatuses 1304, 1306, and 1308 of the described embodiment are designed for coupling at a flange location, but other embodiments may utilize unitary or other non-flange based designs to accomplish the equivalent function(s), as described above. Such alternate embodiments are considered within the scope of this disclosure. Additionally, some embodiments of the downcomers may include a dynamic functionality wherein one or more oil, water, and/or emulsion passages is configured to shift to accommodate a changing oil/water interface level. Some such embodiments may be automatically controlled, e.g., by a computer controller coupled to a level detector 412, other embodiments may include a float mechanism that causes the individual riser and/or downcomer passage(s) to rise and/or fall with the changing oil/water interface level, and still other embodiments include a mechanical assembly permitting operators to manually raise and/or lower the passage(s) based on differences in operating characteristics of the multiphase separation system 1300.

Figure 16:
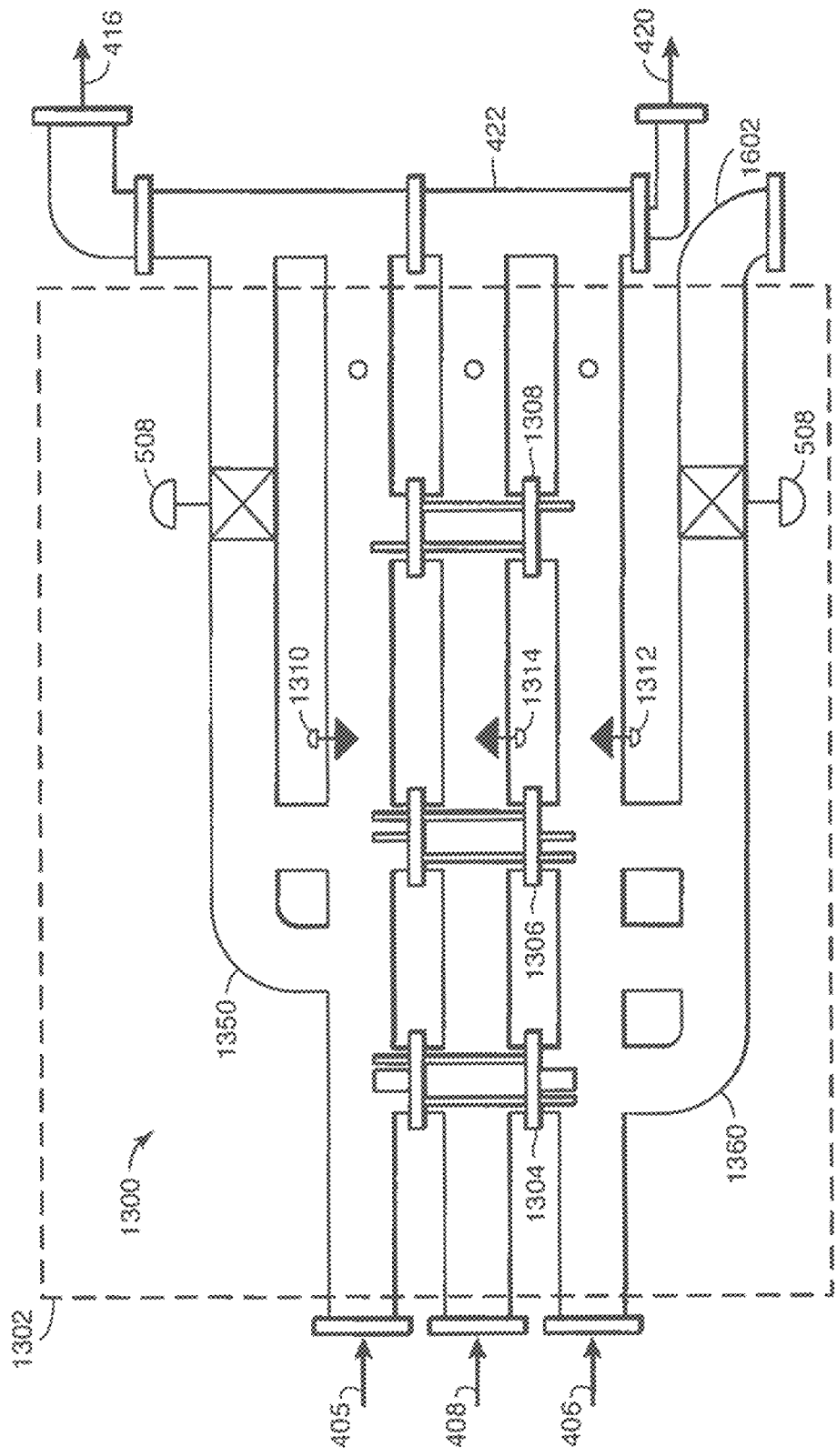
FIG. 16 is a side view schematic diagram of another embodiment of a multiphase separation system.

FIG. 16 is a side view schematic diagram of another embodiment of a multiphase separation system 1600. Like numbered components may be substantially the same as those of the multiphase separation system 1300 of FIG. 13 except as otherwise indicated. The multiphase separation system 1600 has a water outlet 1602 isolated from the control volume 422. The water outlet 1602 may be beneficial at higher water flow rates where the velocity near the bottom of the control volume 422 would otherwise be too high, e.g., causing emulsion to be re-entrained into the water outlet. The multiphase separation system 1600 also has an optional emulsion outlet 420 on the control volume 422. In some embodiments, the optional emulsion outlet 420 may avoid water build-up behind a water header weir, e.g., the weir 1312, due to emulsion layer stagnation and accompanying separation.

While the present techniques may be susceptible to various modifications and alternative forms, the embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A multiphase separation system, comprising:
   a distribution line configured to feed a multiphase fluid into feed lines within the separation system, wherein the feed lines consist of an upper line, a middle line, and a lower line;
   the upper line configured to flow a first stream comprising oil into an oil section of a control volume;
   the middle line configured to flow a second stream comprising an oil/water emulsion into an oil/water emulsion section of the control volume;
   the lower line configured to flow a third stream comprising water into a water section of the control volume; and
   the control volume configured to adjust fluid flow rate at an outlet, wherein the oil section, the water section, and the oil/water emulsion section each commingle at different heights of the control volume.

2. The multiphase separation system of claim 1, wherein the separation system is implemented within a subsea environment, and the multiphase fluid comprises production fluids from a subsea well.

3. The multiphase separation system of claim 1, wherein the upper line, middle line, and lower line are parallel to each other, and perpendicular to the control volume.

4. The multiphase separation system of claim 1, wherein flow rate at an inlet at the control volume is adjusted through use of a control valve at the upper line upstream of the control volume and a control valve at the lower line upstream of the control volume.

5. The multiphase separation system of claim 1, wherein the control volume is configured to flow fluid at an outlet at the top of the control volume, and wherein the fluid flow out of the outlet at the top of the control volume comprises substantially oil.

6. The multiphase separation system of claim 1, wherein the control volume is configured to flow fluid at an outlet at the bottom of the control volume, and wherein the fluid flow of the outlet at the bottom of the control volume comprises substantially water.

7. The multiphase separation system of claim 1, wherein the control volume is configured to flow fluid at an outlet at the middle of the control volume, and wherein the fluid flow of the outlet at the middle of the control volume comprises an oil/water emulsion.

8. The multiphase separation system of claim 1, further comprising a flow regulator in the upper line, the middle line, and the lower line, and wherein the flow regulator comprises a perforated baffle, an adjustable perforated baffle, a gate valve, or any combination thereof.

9. The multiphase separation system of claim 8, further comprising:
a control system configured to adjust open and closed the flow regulator;
a level detector coupled to the upper line, the middle line, or the lower line, wherein the level detector is adapted to measure a phase interface level of water and oil present in a line.

10. The multiphase separation system of claim 1, wherein the upper line, middle line, lower line, or any combination thereof are further configured for a chemical additive to be injected.

11. The multiphase separation system of claim 10, wherein the chemical additive that is injected comprises defoamers or demulsifiers.

12. The multiphase separation system of claim 1, wherein any of the upper line, middle line, or lower line are coupled to an electrostatic coalescer.

13. The multiphase separation system of claim 1, wherein any of the upper line, middle line, lower line, or any combination thereof are configured with droplet coalescing internals.

14. The multiphase separation system of claim 1, further comprising:
a downcomer coupled to the lower line, wherein the downcomer is sealed by a sand boot, and wherein the sand boot is configured with internals to fluidize and remove sand that has accumulated in the sand boot; or
a recycle line coupled to the lower line, wherein the recycle line is configured to fluidize and remove sand that has accumulated, and wherein the recycle line is configured to be on an exterior of the oil section, the water section, or the oil/water emulsion section.

15. The multiphase separation system of claim 1, wherein a pre-separator is utilized upstream of the separation system, and wherein the pre-separator is configured to separate gas from the multiphase fluid.

16. The multiphase separation system of claim 1, wherein an outlet from the control volume is configured to recycle upstream into the upper line, middle line, or lower line.

17. The multiphase separation system of claim 1, further comprising a polishing section, wherein a side draw is coupled from the upper line to the middle line, and a side draw is coupled from the middle line to the lower line.

18. The multiphase separation system of claim 1, further comprising:
a first downcomer/riser apparatus configured to permit the passage of oil from the lower line, the middle line, or both to the upper line, wherein the first downcomer/riser apparatus is further configured to permit the passage of water from the upper line, the middle line, or both to the lower line, and wherein the first downcomer/riser apparatus is further configured to substantially inhibit all other exchanges of fluid between the upper line, the middle line, and the lower line;
a second downcomer/riser apparatus configured to permit the passage of oil from the lower line to the upper line and permit the passage of water from the upper line to the lower line, wherein the second downcomer/riser apparatus is further configured to substantially inhibit all other exchanges of fluid between the upper line, the middle line, and the lower line; or
both the first downcomer/riser apparatus and the second downcomer/riser apparatus.

19. A method for separation of oil and water and oil/water emulsion within a multiphase fluid, comprising:
flowing a multiphase fluid into a distribution inlet of a multiphase separation system;
separating the multiphase fluid into an oil phase, a water phase, and an oil/water emulsion;
separating the oil phase into a line that is in a plane vertically above the plane of the distribution inlet;
separating the water phase into a line that is in a plane vertically below the plane of the distribution inlet;
separating the oil/water emulsion into a line that is in a plane vertically above the plane of the line with the water phase and vertically below the plane of the line with the oil phase;
flowing each line into a vertically oriented control volume, wherein the flow rate from each line is controlled;
detecting an oil level and a water level in each line,
communicating with a controller to open and close control valves based on the oil and water level detected; and
separating each phase by flowing the oil phase, the water phase, and the oil/water emulsion through a different outlet from the control volume.

20. The method of claim 19, comprising regulating the flow rate of the fluid in a line through use of perforated baffles, through adjustment of an adjustable perforated baffle, through use of a gate valve, or any combination thereof.

21. The method of claim 19, further comprising injecting chemical additives into the oil line, water line, and oil/water emulsion line.

22. The method of claim 19, further comprising:
accumulating sand in an additional hollow space of the water line; and
purging sand from the water line.

23. The method of claim 19, further comprising removing dispersed droplets from the bulk phase flowing in an oil line, water line, and oil/water emulsion line in a polishing section upstream of the control volume.

24. The method of claim 19, further comprising recycling fluid from the control volume to upstream in the multiphase separation system.

25. A multiphase separation system, comprising:
an inlet line configured to feed a multiphase fluid into side feed lines within the separation system, wherein the side feed lines consist of an upper line, a lower line, a middle line, or any combination thereof;
the upper line configured to feed an oil side feed line into an oil section, and further configured to split the oil section into an oil/water emulsion section, wherein the oil section is in a plane located vertically above the oil/water emulsion section;
the lower line configured to feed a water side feed line into a water section, wherein the water section is in a plane located vertically below the oil/water emulsion section;
a control volume; and
a control system.

26. The multiphase separation system of claim 25, wherein the control volume is configured as a spherical or horizontal cylindrical multiphase separator.

27. The multiphase separation system of claim 25, further comprising:
measuring a phase interface level in the upper line, the lower line, or both; and
controlling the flow rate at an inlet of the control volume through use of a control valve at the oil section, a control valve at the water section, or both, wherein the flow rate is adjusted at least in part in response to the measured phase interface level.

* * * * *